(12) United States Patent
Kulakowski et al.

(10) Patent No.: US 9,268,949 B2
(45) Date of Patent: *Feb. 23, 2016

(54) SYSTEM AND METHOD FOR DEFINING PROGRAMMABLE PROCESSING STEPS APPLIED WHEN PROTECTING THE DATA

(71) Applicant: Verimatrix, Inc., San Diego, CA (US)

(72) Inventors: Robert T. Kulakowski, San Diego, CA (US); Craig Mautner, San Diego, CA (US); James B. Fahy, Del Mar, CA (US); Jeffrey Bronte, San Diego, CA (US); Greg Hutchins, La Jolla, CA (US)

(73) Assignee: Verimatrix, Inc., San Diego, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/932,801

(22) Filed: Jul. 1, 2013

(65) Prior Publication Data

US 2013/0298255 A1 Nov. 7, 2013

Related U.S. Application Data

(63) Continuation of application No. 12/122,303, filed on May 16, 2008, now Pat. No. 8,478,980.

(60) Provisional application No. 60/938,994, filed on May 18, 2007.

(51) Int. Cl.
  *G06F 21/00* (2013.01)
  *G06F 21/60* (2013.01)
  (Continued)

(52) U.S. Cl.
  CPC ............... *G06F 21/60* (2013.01); *G06F 21/10* (2013.01); *H04L 9/088* (2013.01); *H04L 9/16* (2013.01); *H04L 2209/24* (2013.01); *H04L 2209/603* (2013.01)

(58) Field of Classification Search
  CPC .......... G06F 21/60; G06F 21/10; H04L 9/088; H04L 9/16; H04L 2209/24; H04L 2209/603
  USPC ............. 726/26; 713/150; 707/687, 397, 398, 707/697, 986; 705/50, 51
  See application file for complete search history.

(56) References Cited

U.S. PATENT DOCUMENTS

| 4,658,093 A | 4/1987 | Hellman |
| 4,817,140 A | 3/1989 | Chandra et al. |

(Continued)

FOREIGN PATENT DOCUMENTS

| EP | 1564622 | 8/2005 |
| WO | 00/76119 A1 | 12/2000 |

(Continued)

OTHER PUBLICATIONS

Extended European Search Report mailed on Aug. 25, 2014 for related EP Patent Application No. 08755715.3, in 7 pages.

(Continued)

*Primary Examiner* — Sarah Su
(74) *Attorney, Agent, or Firm* — Procopio, Cory, Hargreaves & Savitch LLP

(57) ABSTRACT

Systems and methods for protecting data being sent between a client and a server include the capability of defining programmable processing steps that are applied by the server when protecting the data and the same steps are applied by the client when unprotecting the data. The programmable processing steps can be defined uniquely for each client, and the programmable processing steps are selected from a number of functions using sequencing data that defines the processing steps. The programmable processing steps allow for each client to process encrypted data in a different manner and the programmable processing steps are defined by what is called a digital rights management (DRM) Sequencing Key, and as such the system and method introduces a key-able DRM whereby each DRM message can be processed in a unique (or pseudo unique) manner.

14 Claims, 10 Drawing Sheets

(51) Int. Cl.
*G06F 21/10* (2013.01)
*H04L 9/08* (2006.01)
*H04L 9/16* (2006.01)

(56) References Cited

U.S. PATENT DOCUMENTS

| | | | |
|---|---|---|---|
| 4,853,962 A | 8/1989 | Brockman | |
| 5,237,611 A | 8/1993 | Rasmussen | |
| 5,239,581 A | 8/1993 | Hane | |
| 5,301,231 A | 4/1994 | Abraham et al. | |
| 5,452,358 A | 9/1995 | Normile et al. | |
| 5,592,212 A | 1/1997 | Handelman | |
| 5,982,891 A | 11/1999 | Ginter et al. | |
| 6,023,564 A | 2/2000 | Trimberger | |
| 6,178,242 B1 | 1/2001 | Tsuria | |
| 6,636,970 B2* | 10/2003 | Akiyama et al. | 713/189 |
| 6,980,650 B2 | 12/2005 | Wachtfogel et al. | |
| RE39,166 E * | 7/2006 | Gammie | 380/228 |
| 7,093,137 B1 | 8/2006 | Sato et al. | |
| 7,340,102 B2 | 3/2008 | Makiyama et al. | |
| 7,370,192 B2 | 5/2008 | Sumner | |
| 7,512,986 B2 | 3/2009 | Shen-Orr et al. | |
| 7,610,247 B2 | 10/2009 | Bleumer | |
| 8,478,980 B2* | 7/2013 | Kulakowski et al. | 713/150 |
| 2001/0011253 A1* | 8/2001 | Coley et al. | 705/59 |
| 2001/0025340 A1* | 9/2001 | Marchant | 713/150 |
| 2001/0050989 A1 | 12/2001 | Zakiya | |
| 2002/0018565 A1 | 2/2002 | Luttrell et al. | |
| 2002/0104006 A1* | 8/2002 | Boate et al. | 713/186 |
| 2002/0116623 A1 | 8/2002 | Bussert | |
| 2003/0005321 A1 | 1/2003 | Fujioka | |
| 2003/0035547 A1 | 2/2003 | Newton | |
| 2003/0084310 A1 | 5/2003 | Akiyama et al. | |
| 2004/0139339 A1* | 7/2004 | Yeh et al. | 713/193 |
| 2004/0170334 A1 | 9/2004 | Makiyama et al. | |
| 2005/0015616 A1* | 1/2005 | Hogan | G11B 20/00086 726/26 |
| 2005/0021961 A1 | 1/2005 | Hanks et al. | |
| 2005/0132192 A1* | 6/2005 | Jeffries et al. | 713/169 |
| 2005/0289061 A1* | 12/2005 | Kulakowski et al. | 705/50 |
| 2006/0048113 A1 | 3/2006 | Ozone et al. | |
| 2006/0050877 A1 | 3/2006 | Nakamura | |
| 2006/0075397 A1 | 4/2006 | Kasahara | |
| 2006/0265337 A1* | 11/2006 | Wesinger | 705/65 |
| 2007/0021198 A1* | 1/2007 | Muir et al. | 463/29 |
| 2007/0255941 A1 | 11/2007 | Ellis | |
| 2008/0182592 A1* | 7/2008 | Cha et al. | 455/456.3 |
| 2008/0199004 A1 | 8/2008 | Mantin et al. | |
| 2008/0310624 A1 | 12/2008 | Celikkan et al. | |
| 2009/0100309 A1 | 4/2009 | Zheng | |
| 2009/0144551 A1 | 6/2009 | Belenky | |
| 2009/0147958 A1 | 6/2009 | Calcaterra et al. | |
| 2010/0067687 A1* | 3/2010 | Chandramouli et al. | 380/37 |
| 2010/0275034 A1 | 10/2010 | Safa | |
| 2010/0278338 A1 | 11/2010 | Chang et al. | |
| 2010/0325431 A1* | 12/2010 | Mordetsky | G06F 21/125 713/167 |
| 2013/0214902 A1* | 8/2013 | Pineau et al. | 340/5.61 |

FOREIGN PATENT DOCUMENTS

| | | |
|---|---|---|
| WO | 2005/091551 | 9/2005 |
| WO | 2005/109146 | 11/2005 |
| WO | 2005/119677 | 12/2005 |

OTHER PUBLICATIONS

International Search Report and Written Opinion for related PCT/US2008/063913 dated Oct. 10, 2008.

* cited by examiner

To define state machine or virtual machine processing function/flow

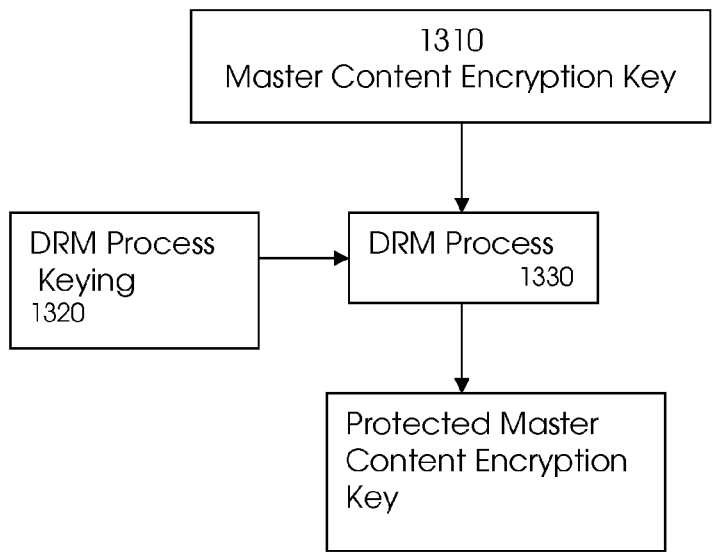
Figure 10
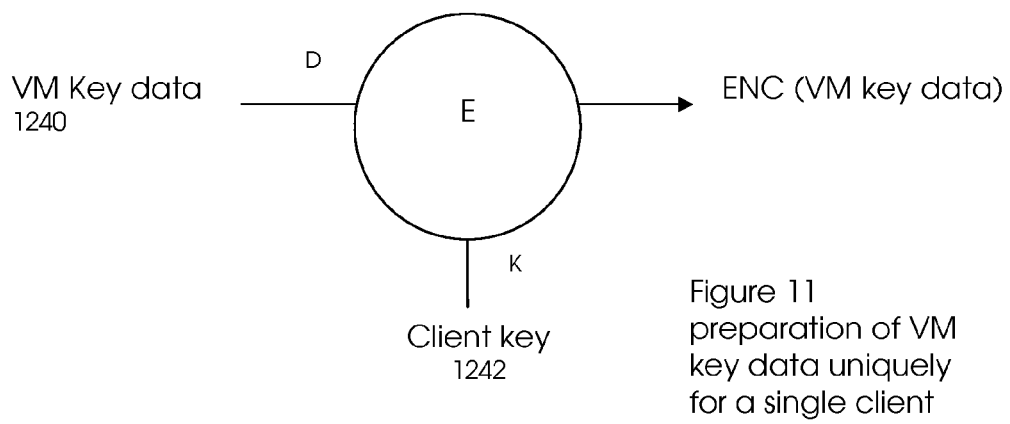
Figure 11 preparation of VM key data uniquely for a single client Sequence Maps

SYSTEM AND METHOD FOR DEFINING PROGRAMMABLE PROCESSING STEPS APPLIED WHEN PROTECTING THE DATA

CROSS-REFERENCE TO RELATED APPLICATIONS

This application is continuation of U.S. application Ser. No. 12/122,303, filed May 16, 2008, which claims the benefit of U.S. provisional application Ser. No. 60/938,994, filed May 18, 2007, which are hereby incorporated by reference in their entirety.

BACKGROUND

1. Field of the Invention

The present invention relates to data security and to systems and methods for encrypting and decrypting data transmitted between devices.

2. Related Art

Digital piracy and computer hacking is a common problem, particularly now that digital content is often made available to the public over the Internet. Digital piracy occurs at content creation sites, content preparation sites, as well as in content distribution networks.

Piracy or theft of digital content is a particular problem for content distribution systems such as digital down load services and cable television companies. There are security techniques available to secure digital content files, including cryptography, watermarking, and the like. In spite of these practices, digital piracy still occurs as a result of hacking, theft and the like.

Therefore, what is needed is a system and method that reduces or overcomes these significant problems and others found in the conventional systems as described above.

SUMMARY

Certain embodiments as disclosed herein provide for systems and methods for protecting data being sent between a client and a server including the capability of defining programmable processing steps that are applied by the server when protecting the data and the same steps are applied by the client when unprotecting the data. The programmable processing steps can be defined uniquely for each client, and the programmable processing steps are selected from a number of functions using sequencing data that defines the processing steps. The programmable processing steps allow for each client to process encrypted data in a different manner and the programmable processing steps are defined by what is called a digital rights management (DRM) Sequencing Key, and as such the system and method introduces a key-able DRM whereby each DRM message can be processed in a unique (or pseudo unique) manner. DRM Sequence Key is data used to define the sequence of processing steps and key data that is performed on input data being protected by the DRM process described herein. DRM Sequence Key and DRM Sequence data are used interchangeably in this patent application.

Other features and advantages of the present invention will become more readily apparent to those of ordinary skill in the art after reviewing the following detailed description and accompanying drawings

BRIEF DESCRIPTION OF THE DRAWINGS

FIG. 10 is a representation of a process for protecting the master content encryption key.

FIG. 11 is a simplified block diagram of a client specific Virtual Machine or Sequence Data being uniquely encrypted for a particular client

DETAILED DESCRIPTION

Figure 1:
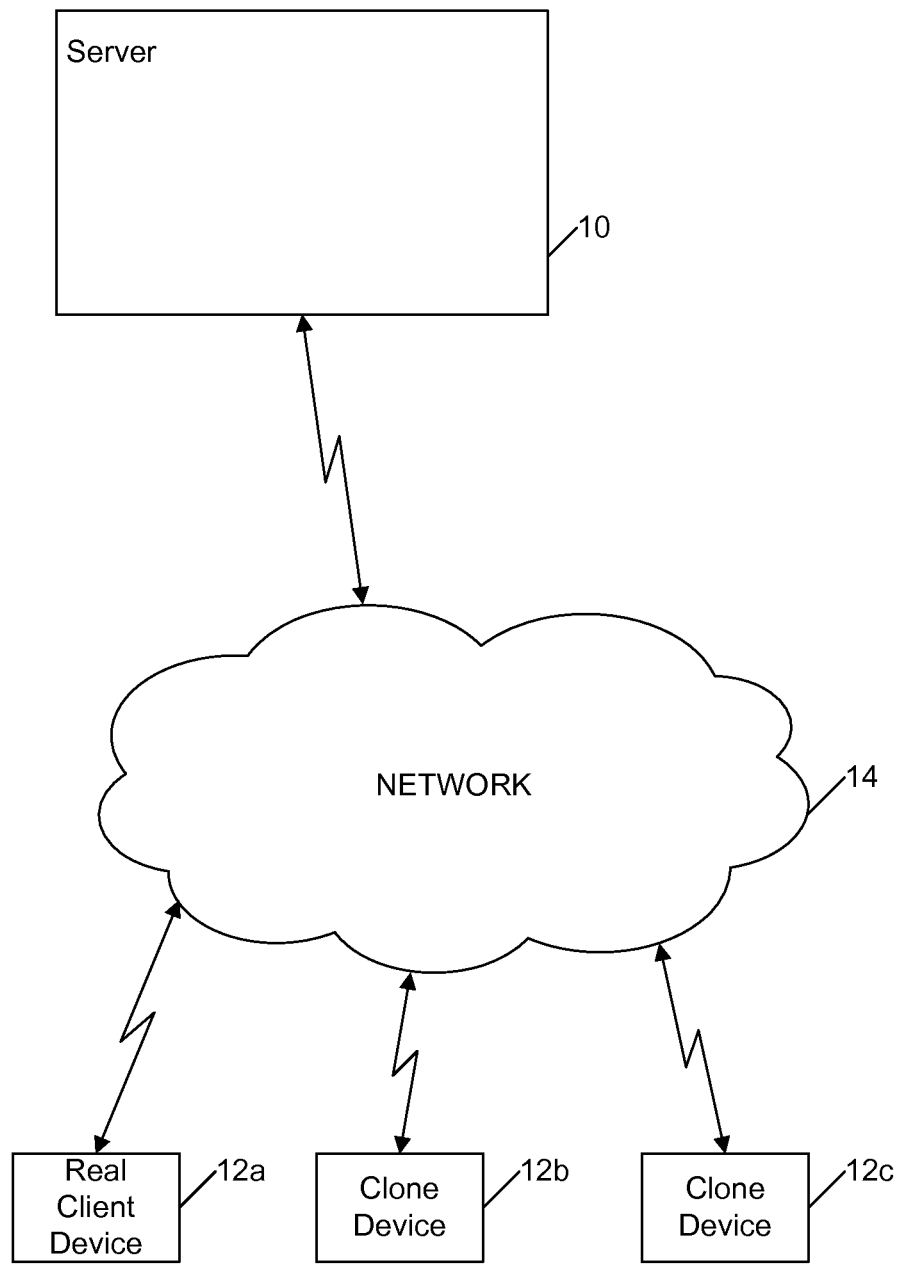
FIG. 1 is a block diagram of a system according to one embodiment.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention Certain embodiments as disclosed herein provide for systems and methods for protecting data being sent between a client and a server including the capability of defining programmable processing steps that are applied by the server when protecting the data and the same steps are applied by the client when unprotecting the data. The programmable processing steps can be defined uniquely for each client, and the programmable processing steps are selected from a number of functions using sequencing data that defines the processing steps. The programmable processing steps allow for each client to process encrypted data in a different manner and the programmable processing steps are defined by what is called a digital rights management (DRM) Sequencing Key, and as such the system and method introduces a key-able DRM whereby each DRM message can be processed in a unique (or pseudo unique) manner. DRM Sequence Key is data used to define the sequence of processing steps and key data that is performed on input data being protected by the DRM process described herein. DRM Sequence Key and DRM Sequence data are used interchangeably in this patent application.

In this patent application the following terms are used and have the following meanings.

DRM Process: The Digital Rights Management (DRM) Process is the processing performed to protect data being sent between the client and server. The DRM process consists of the application of a sequence of functions (reversible, cryptographical, and other) executed by the server to protect (encrypt and obfuscate) data and then performed by the client to remove, or undo, the protected processed applied to the data. The DRM process described herein is the sequence of steps used to secure data such as applying encryption algorithms with one or more keys, hashing functions, data transformation steps (linear and non-linear), data mapping functions whereby input data is mapped to different output data, data shifting, data substitution, functions including round or rounds key whereby a round of the algorithm gets a new key or a round key is obtained from server data, data shifting, Exclusive OR-ing (XOR), bit reversal, bit transformation, applying one or more rounds of a multiple round encryption algorithm, and other functions in an effort to secure the data.

The DRM Process can consist of a single cryptographic processing step or more preferably the application of multiple processing steps including the use of one or more standard encryption algorithms with additional cryptographic functions applied to further obfuscate the data. The DRM process can be applied to any system data including content usage rights information for digital content or media, content control information (play once, do not allow copy, expiration date, billing data, movie access criteria, etc.), content keys for decrypting encrypted content, and any other data sent between a server and a client in either direction, or applied to any data used in a system including the data used by the DRM process.

State Table: The term State Table or sequencer is used to define any type of software structure, method, or data that can be used to define the sequence of instructions, function classes, or processing performed by a computer device. The term state machine, virtual machine or VM, VM instruction set, sequencer, control loop, compiler, interpreter, etc. are examples of current software methods that process software instructions when executing code and the processing is determined by the state machine definition, the virtual machine instruction set, the software design, the software design of the control loop, the design of the compiler or interpreter, etc. In this patent application any form of virtual machine, state machine, sequence, control loop, or any other structures can be used to sequence the flow of instructions performed by a process with the sequencing steps defined by a State Table appropriate for the software method used. For example the State Table for a Virtual Machine will be different than the State Table for a control loop or interpreter; however the State Table for each method is defining the software sequencing for the particular method, and can be, but does not need to be in a State Table format. It is envisioned that any form of sequence control can be used to define the computational steps (or computational flow) that is executed or applied when processing. Some or all of the control to define the sequence performed is defined in the virtual machine instruction set, a computer's instruction set, the state machine state table, the interpreters instruction set or the control sequencing data collectively or individually and such is referred to as a State Table or State Machine or Virtual Machine in this patent application. The State Table in any embodiment (VM, sequencer, byte code interpreter, etc.) as used herein can be further encrypted using a common key for all clients or the State Table can be uniquely encrypted for each client. The State Table decryption key used to decrypt the code that actually implements the State Table can be a standalone key contained in the client library code or a key separate from the client library code, or it can be part of the DRM Sequencing Key information or part of the client library or separate from the client library and delivered in any manner. This means that the DRM Sequence Key can also include the keys necessary to decrypt the encrypted State Table execution code so that the CPU (central processing unit) in the client device can execute unencrypted State Table based processing sequences. In one embodiment there can be one or more State Tables or Sequencers and each one can be different and can have different encryption algorithms and keys used to protect the code that is used to implement the State Table processing or Sequencer or VM and each of the different encryptions can have a common key, a unique key, or a State Table unique key, and any of these keys can be in the client library, or external to the client library or a combination of both and can also be contained in DRM Sequence Key data. In fact multiple keys can be used and an indicator within the State Table or VM can indicate which key should be used when decrypting the State Table or VM data, and even different encryption algorithms can be used as well.

State Machine: This term refers to any one of a number of software methods that defines the software processing sequences using either table data, instruction set definitions, virtual machine instructions, compiler techniques, control loop design methods, interpreter design, or any software method that defines the sequence of instructions used by a Central Processing Unit (CPU) of a computer. Examples of a State Machine include, but are not limited to, the following: C or C++ switch-case statement constructs, virtual machines of any sort, IF/Then type software control flow, byte code interpreters, compilers (e.g., C, C++, C#, Java, Forth, Basic, Fortran, etc.), state machine definition languages, any type of interpreter (e.g., Java, C#, BASIC, Forth, Basic, etc.), or any script control method that can perform processing sequences or provides Application Programming Interfaces (APIs) such as Soap, .net, CGI, etc., or programming utilities such as Ruby-on-Rails, Perl, PHP, JavaScript, etc. The State Machine in various embodiments of this invention can be further encrypted using a common key for all clients or the State Machine can be uniquely encrypted for each client. The State Machine decryption key can be a standalone key or it can be part of the DRM Sequencing Key information, and can be delivered in a broadcast or unicast method, as part of the client library or separate from the client library, and one or more keys can be used as defined in the State Table section above, or using any type of keying method or key exchange method. In addition, the State Machine in any embodiment (VM, sequencer, byte code interpreter, etc.) as used in this invention can be further encrypted using a common key for all clients or the State Machine can be uniquely encrypted for each client. The State Machine decryption key can be a standalone key or it can be part of the DRM Sequencing Key information and can be part of the client library or separate from the client library meaning download at a different time than the client library and not contained as part of the client library. In some embodiments there can be one or more State Machines or Sequences or VMs and each one can be different and have different encryption used to protect the code used to implement the State Machine processing or Sequencer or VM and each of the different encryptions can have a common key or a State Machine unique key. In fact multiple keys can be used and an indicator within the State Machine or VM can indicate which key should be used when decrypting the State Machine or VM data, and even different encryption algorithms for different parts of the processing can be used as well.

FIG. 1 is a block diagram of a system according to one embodiment in which a server 10 and one or more client devices 12a, 12b and 12c communicate over a communication network 14. The communication network can be, for example, a local area network, a wide area network, the Internet or a combination of these and other networks which allow the server 10 and the client devices 10 to exchange communications. The networks can be wired and/or wireless. The server 10 can be a general purpose or special purpose computer or a collection of such computers. The client devices 12 can similarly be a set top box (STB) (typically used for cable and satellite television systems), a general purpose computer or a special purpose computer including any of the numerous computing devices available which allow for communications over a network, for example, a home computer, a lap top computer, a personal digital assistant or a mobile telephone.

The DRM Sequencing Key or DRM Sequence Key steps performed using the described systems and methods can be unique (or pseudo unique) for each client in a system in that both the server and the client will use client unique processing steps derived from a client unique DRM Sequencing Key or DRM processing Sequence Key when preparing or processing (encrypting or decrypting) data using the DRM process. When the systems and methods are applied to protecting data sent between client and server, the systems and methods generate encrypted key data (or any type of data) that is protected by a client unique set of DRM processing steps. This can be achieved using a single common code download to all the clients in the system. The DRM process for each client, or even each message exchange, can be unique because the individual functions applied to protect or encrypt the data are configurable using the DRM Sequencing Key. The systems and methods described herein allow for a client unique DRM processing method to be derived from a common firmware or software code image sent to all clients. This can eliminate the need for distributing a unique client firmware image to each client device. Software methods to generate a unique client software code image for each client device, meaning the run-time software code image for each client device, can be included. Either methods or both methods, common firmware image download and client unique firmware download image, can be used. In many broadcast networks, such as cable and satellite video networks, the network bandwidth and time necessary to delivery millions of unique clients to millions of client devices (e.g., STBs) is not available. However, in two-way networks such as the Internet and where software (e.g., initial set up) is downloaded individually by each client, then the code image delivered to each client can be unique. In satellite and cable (one-way) networks, a common code image can be sent to all the clients. During the client device firmware update process, the client image can be further scrambled by the client device resulting in each client code image being unique (or nearly unique). The way the client scrambles the code image will be known by the server so that the server can process the input data correctly for an individual client.

In one example application, at client device startup time there is no client library DRM process flow data (DRM process or DRM Sequencing Key (Sequencer Data 60), or VM instruction decryption key, or State Machine keying data) contained in the client library code image. This means that the client does not know how to decrypt messages without additional data sent separately from the server to the client library. The processing sequence or software code flow for the client library is defined by a DRM Sequencing Key defined by Sequence Data 60 containing virtual instruction data, sequence data, state table or state table keying data that will be called the DRM Sequencing Key and the DRM Sequencing Key is downloaded from a server at client power-on or reset, or when the client needs the DRM Sequencing Key for decryption data or the DRM Sequencing Key information is stored and provided from data in smart card or sent securely over a network or obtained by any other data exchange method including over a network, obtained from hardware, obtained using a hash of client specific identifier data, etc. By not storing the DRM Sequencing Key in the Client Firmware Code image the client library cannot be hacked by using static code analysis tools such as IDAPro and there is no run-time function call tree data that a hacker can use to understand the operation of the client library.

Figure 2:
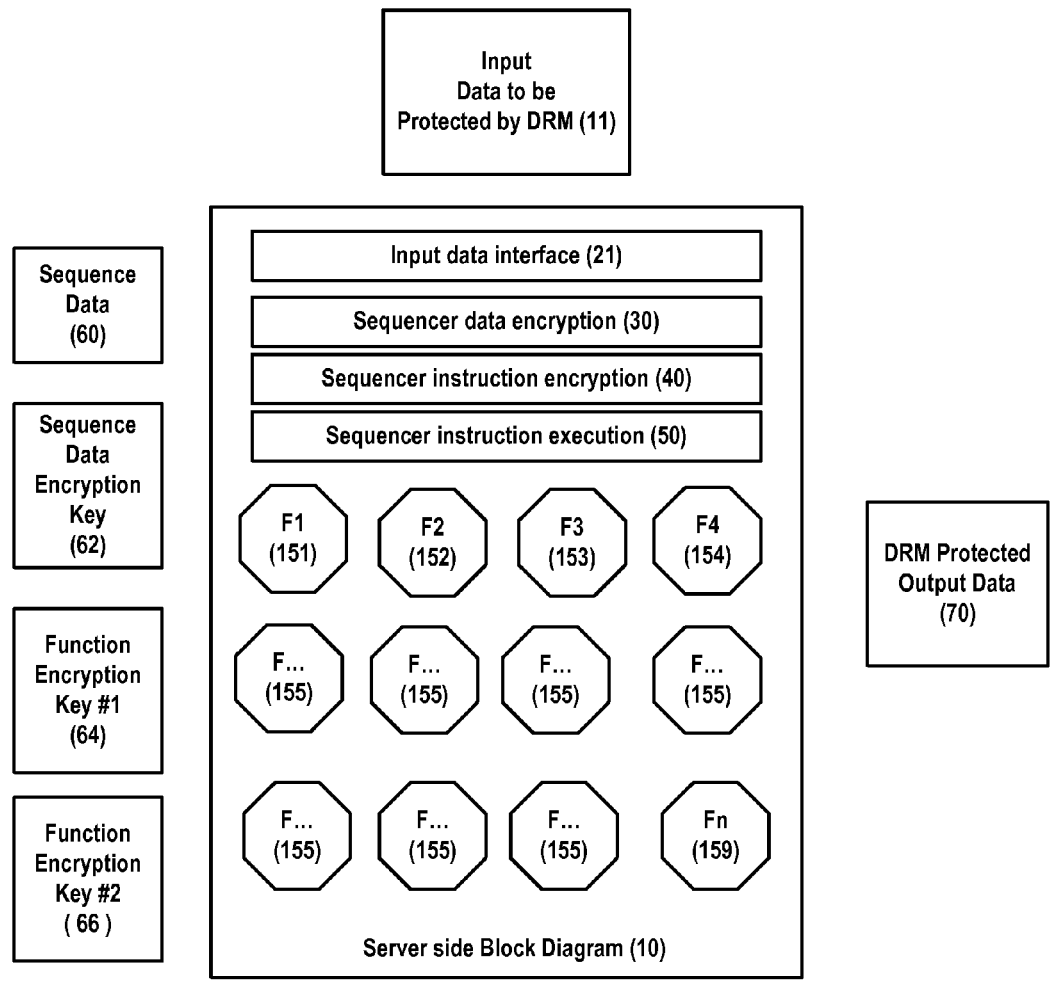
FIG. 2 is a functional block diagram of the server 10 of FIG. 1.

FIG. 2 is a functional block diagram of the server 10 of FIG. 1. Input Data 11 is data that is to be secured by the DRM process. This data can be any type of data, for example, digital media content such as music or movies or other information. Input data interface module 21 is an interface for receiving the input data 11 that will be protected. Sequencer Data (or DRM Sequence Key) 60 is the data that defines the sequence flow of how functions F1 (151) through Fn (159) are executed. Sequencer Data 60 is in a format compatible with the form of State Machine or State Table used in the client device, or Sequencer Data 60 will be in a format that when transformed through a function or set of functions results in data that is in a format compatible with the client device. Sequencer Data 60 can also be used to modify the actual code contained in the client device (e.g., one or more of the functions F1 (151) through Fn (159) on the client device and described below). This creates self-modifying software where the DRM Sequence Key or Sequencer Data 60 is used to modify the client library software instructions creating self-modifying code driven by DRM Sequence Key 60 data. The self modified code can make each client unique at run time or when the client library is downloaded during the install process.

An optional step in an embodiment is to use the Sequencer data encryption module 30 to encrypt the Sequence Data 60 before sending the Sequence Data 60 to the client. The key or keys used by the Sequencer data encryption 30 can be unique for each client, or the keys can be common for all the clients or groups of clients, or they can be a combination of some keys being unique per each client and common for all or groups of clients. The keys for the Sequence data encryption 30 can be included as part of the client library release, or they can be sent in a separate message between the server and the client or they can be added as additional data to messages sent from the server to the client. Sequencer data encryption 30 can also be used to encrypt the functions F1 (151) through Fn (159) using one or more encryption keys, or one or more encryption algorithms, or both. Optionally, additional encryption keys shown as Function Encryption Keys #1 (64) and Function Encryption Key #2 (66) can be included to encrypt Functions F1 (151) through Fn (159). One, two, or more Function Encryption Keys (64 and 66) can be used in a system with the Function Encryption Keys being delivered in any manner (preferably encrypted) to the client, for example, using a secure unicast connection, over a one-way channel, over a two-way channel, or integrated into the client library code, or into hardware accessible by the client device, or into a smart card or secure memory.

Sequencer Instruction Execution module 50 is the code that performs the sequencing of the execution of the Functions F1 (151) through Fn (159). An additional optional step is to encrypt the Sequencer Instructions and this is shown as Sequencer Instruction Encryption module 40 and this step encrypts the actual code used to implement the Sequencer 50. One or more keys and encryption methods can be used by the Sequencer Instruction Encryption 40 to encrypt the Sequencer Instruction set or control data.

The Functions F1 (151) through Fn (159) represent a set of processing functions that are used to protect the Input Data 11 according to the sequence data 60. These functions are portions of algorithms or complete algorithms including the following algorithm types: encryption algorithms, hashing functions, data transformation steps (linear and non-linear), data mapping functions whereby input data is mapped to different output data, data shifting, data substitution, functions including round or rounds key whereby a round of an algorithm gets a new key or a round key is obtained from server data and the round is one pass through a single or multiple pass algorithm, data shifting, Exclusive OR-ing (XOR), bit reversal, bit transformation, applying one or more rounds of a multiple round encryption algorithm, and other functions that are used to secure the data, obfuscate the DRM process, add additional security, shuffle data in memory, transform and/or shuffle data in memory, and other functions. The functions can use one or more keys for functions that use algorithms requiring keys and the functions can include other data to provide additional programmability to the functions where appropriate. For example, when a function such as F3 (153) is used to shuffle data, the way the shuffling is performed can be based on data within the function itself, or data supplied by other functions, or data supplied by the server 10, or data embedded within the client library.

The output of the application of the functions (functional processing) is DRM Protected Output Data 70. The Server side processing to generate the DRM Protected Output Data 70 can be summarized as follows:

1. Input Data 11 to be protected by the DRM is provided to the Input Data Interface 21.
2. Sequencer Data 60 is generated that contains data that describes the way the sequences of Functions (F1 151 through Fn 159) should be sequenced to process the Input Data 11. Sequencer Data 60 can also contain keys and other data used by Functions F1 (151) through Fn (159) when being processed.
3. Sequencer Data 60 is used as input by Sequencer Instruction Execution 50 to define the execution sequence of Functions F1 (151) through Fn (159)
4. Upon completion of Sequencer Instruction Execution 50 the processed data is output as DRM Protected Output Data 70.

Step 3 above (performs the Sequencer Instruction Execution 50) works as follows:

a. Using a first portion of the Sequence Data 60 execute the function or functions associated with the first portion of Sequencer Data 60.
b. Using the next portion of the Sequencer Data 60 execute the function associated with the next portion of Sequencer Data 60
c. Repeat step B above until all the processing has been performed. For example, if Sequencer Data 60 consists of 128 bits and there are 16 function groups per client (4 bits) there can be 128/4=32 functions selected by the sequencer. The first step will use 4 bits of Sequence Data 60 to select 1 of 16 functions; step 2 will use the next 4 bits of Sequence Data 60 to execute a second function from a group of 16, etc. It should be noted that the partitioning of Sequence Data 60 as explained above is only one example of how Sequencer Data 60 can map to process execution. There are many other different ways one skilled in the art can implement such a sequencer.

To further illustrate the sequencer operation, consider a library with 512 different Functions (F1 (151) through F512 (159)). The Sequencer Data can be a simple value containing the binary values for the function numbers and the sequence in which they should be executed. For example, the DRM Processing for the Input Data for one client can use the following function sequence:

Processing Sequence: F14, F57, F396, F127, F241, F501, F8, F72

Then using a simple data structure where the sequence is defined as the binary values for the function number, the following Sequence Data would indicate to the Sequencer Instruction Execution module 50 the DRM process Function processing:

Sequence Data in decimal: 014, 057, 396, 127, 241, 501, 008, 072.

In the above example, the Sequence Data 60 is shown as 3 character decimal numbers. However, in one example, the Sequence Data 60 is not a simple data structure containing the Function numbers to be executed in sequential order. In this example the Sequence Data 60 is scrambled and obfuscated so that determining the call sequence of the Functions (F1 151 through Fn (159)) is not easy and forces a hacker to perform more complicated software analysis during their system hacking. In addition the Sequence Data 60 can optionally be encrypted as well as encrypting the code used to identify any of the functions within the system. Any other type of data structure, instruction set definition, instruction set grouping or mapping, value hashing or compression can be used to expand the Sequence Data 60 into the actual instructions and Functions used to implement the DRM Process when preparing DRM Protected Output Data 70.

At the time of execution of a Function, some of the Sequence Data 60 that has not been used before this point can be modified by Functions being called in effect creating self-modifying Sequence Data 60 that will require the correct Function to be called in order to generate the newly updated and correct remaining Sequence Data 60. A similar process can be applied to the overall DRM process where the correct sequence of Functions (F1 151 through Fn 159) will need to be called to prepare data used not only to process the Input Data (11) but also is used to modify Sequence Data (60).

There are many ways that the Functions can be decomposed into functional pieces and one example will be described below. With a DRM system it is important to establish the cryptographic strength of the DRM processing to make sure that the cryptographic architecture of the system meets minimum criteria for security. In one example one or more of the Functions of this system provide a minimum cryptographic strength for the system. What this means is that the DRM processing of the system includes at a minimum at least one Function with a known acceptable cryptographic strength. For example, one Function can be a 128 bit or 192 bit AES algorithm establishing the minimum encryption strength at this level. There are other Functions that increase the minimum encryption strength but, it is easier to understand and explain the minimum cryptographic strength of a system by saying the systems cryptographic strength is stronger than a well known acceptable standard such as 128 bit AES encryption. Additionally, more than one acceptable encryption algorithm can be used to establish the cryptographic strength when using more than a single encryption Function. For example, the system can use both 128 bit AES and 192 bit AES and Triple-DES. Further, there are additional less secure Functions included to help obfuscate the DRM processing and to add complexity to the reverse engineering and hacking of the DRM process. The Sequencer Data 60 indicates the functions to be executed and in some embodiments Functions with various cryptographic strengths will be used, selected from one or more categories of Functions each with different cryptographic strengths. For example, assume that in general there are four categories of Functions where each category has similar encryption strength, the categories may be arranges as follows:

Category 1: Full 128 bit AES, Full 192 bit AES, triple DES, BlowFish, etc.
Category 2: 11 rounds of AES, 5 rounds of Triple DES, 17 rounds of AES, 6 rounds of Blowfish, etc. When only a number of rounds of a particular multiple round algorithms is used the actual number of rounds executed can be determined by Sequence Data 60.

Category 3: XOR, bit shift, transform, map, math functions, hash, authenticate, block process, etc.

Category 4: data transpose, data shuffle, data memory shuffle, data address shuffle, data scramble Each Function in each Category as shown above is actually decomposed into tens or hundreds of little function pieces whereby the large number of little function pieces will need to be executed to implement the function shown in the categories above. For example, the Full 128 bit AES algorithm will be decomposed into a number of smaller Functions that implement one or more steps of the AES algorithm with the functions being as small as working on one line of code of the algorithm, or a portion of one round, or one round, or any other algorithm or code dissection size. The DRM Process and the DRM Sequence Key or DRM Sequence Data 60 will contain data that will cause one or more Function to be executed from one or more categories. When a Function is decomposed into a group of smaller functions, the DRM Sequence Key or DRM Sequence Data 60 will contain data to execute all the pieces of a Function or the design of the Sequencer Instruction Execution (50) will execute all the pieces of the Function that were created as part of the dissection of the Function into smaller pieces.

Figure 3:
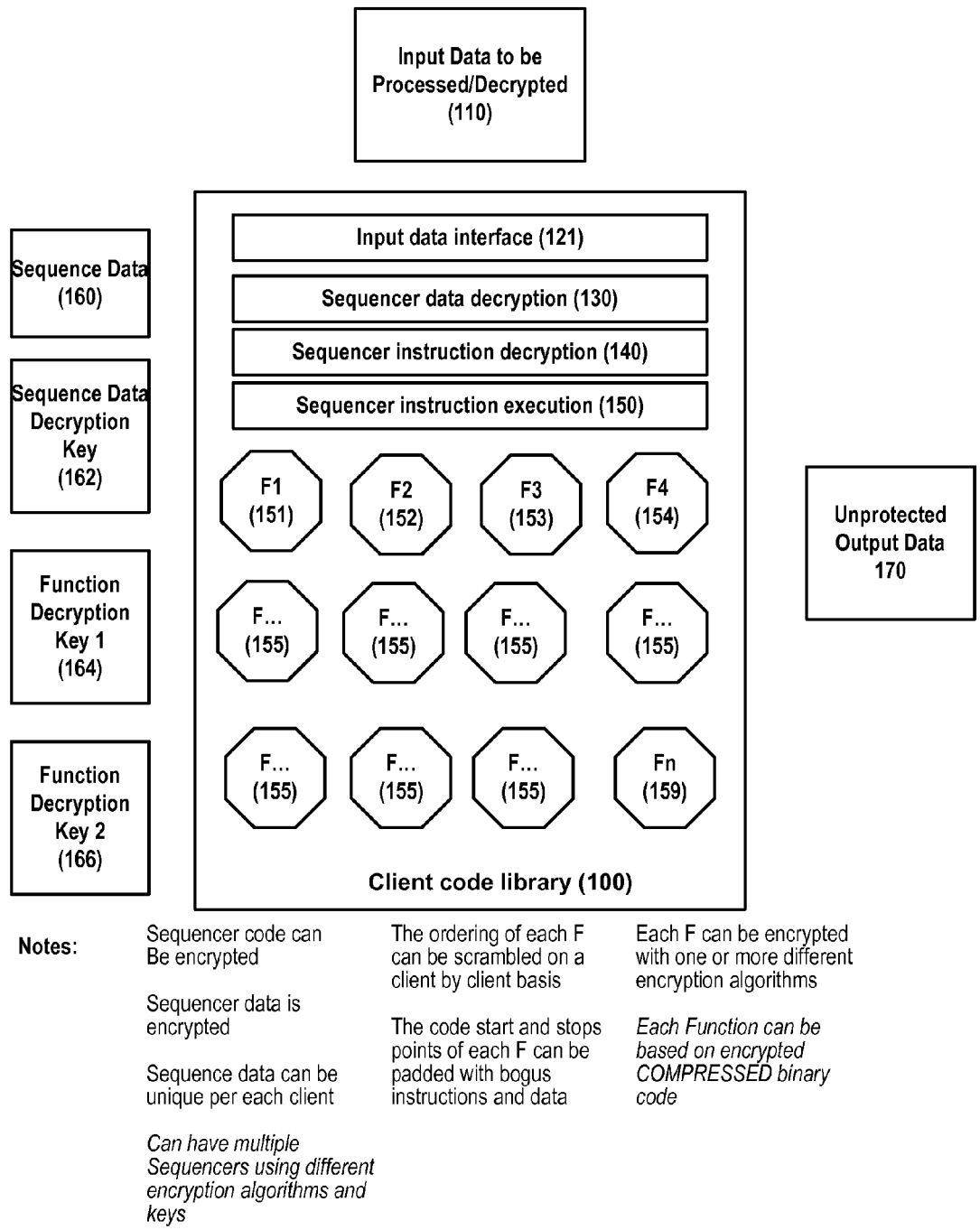
FIG. 3 is a functional block diagram of the client library structure on a client device.

FIG. 3 is a functional block diagram of one embodiment of the client library structure on a client device such as client device 12 of FIG. 1. Input Data to be Process or Decrypted 110 is input to the Client code Library or module 100 via the Input Data Interface module 121. Sequencer Data 160 instructs, or is the instructions for, the Sequencer Instruction Execution module 150 how to process the Input Data 110 by using a sequence of Functions F1 (151) through Fn (159). The Sequencer Data 160 is used to select the Functions that will decrypt and remove the protection added by the Server Side DRM Processing described in FIG. 2.

Upon completion of most or all of the DRM Processing as indicated by the Sequencer Data 160, the processed Input Data 110 has most or all of the DRM Processing removed and the output is Unprotected Output Data 170. In some embodiments the above processing performs most of the DRM Processing because in some systems it is preferred to output data with most but not all of the DRM Processing performed on the data so that data is not being output in the clear and the Output Data 170 will still need additional processing by the process or function using the Output Data 170. This keeps the Output Data 170 partially protected when being output to another function or interface. The function or interface receiving the Output Data 170 will apply the remaining necessary steps to remove any partial processing that needs to be performed before it can use the data. Alternatively, it is also possible to not output Unprotected Output Data 170 from the Client Library 100 but, to instead output data that is encrypted with an encryption process known to the function or process receiving Output Data 170.

While the same functions F1 (151) through Fn (159) are shown in both the Server Side Block Diagram of FIG. 2 and the Client Code Library 100 in FIG. 3, they do not need to be the same. When they are not the same, mapping information will need to be provided to the client (explicitly or implicitly) so that the DRM Process can unprotect the Input Data (110) to the Client using the remapped function and adjusting the Sequence Data (60 and 160).

In one embodiment each client gets run time client specific information that indicates how the Sequencer 150 should sequence through the Functions in the form of a DRM Sequencing Key referred to as Sequence Data 160. The Sequence Data 160 can be provided by a unicast message sequence between a server and a specific client, or the Sequence Data1 160 can be downloaded by the client from a server, or it can be provided as part of a client software install, or as one part of a multiple part software download process where Phase 1 of 2 of a DRM loader process distributes a single common code image to all clients over a multicast or carousel type download and Phase 2 of the 2 phase DRM loader occurs in a unicast manner with unique code or state sequence instruction flow data that is unique to each client being distributed in Phase 2. The description of a two phase loader illustrative of the process and the actual steps can be consolidated into a single software download where the download includes a client common code base along with Client Specific key (or keys or DRM keys or Sequence Data 60 and 160) that define how the client library processing flow is performed by each client. Of course the client library code image can also be unique for each client if the system contains sufficient bandwidth to download client unique libraries for each client on the network. An example of when a client specific code library can be delivered is when a personal computer downloads an application code image where the download of the code image is part of an install process. Optionally, the Sequence Data 160 can be contained in an obfuscated form as part of the client library.

In this application the term Smart Card refers to a smart card type device containing a secure microprocessor, or a chip that has secure memory, or secure identity, or encryption processing facilities with a unique identifier, or a personal computer central processing unit that contains secure processing support or secure memory. Any of these hardware and software processing techniques used for security are collectively referred to as a Smart Card in this patent application.

When a client device such as a Set Top Box contains a Smart Card, a part of the code execution for the client library will require Client Specific Keying data obtained from the Smart Card or processed with data contained in the Smart Card in the client. This means that a common client software image can be distributed to all client devices operating on a network and the software execution of the client library will be unique for each client based on DRM Sequencing Key data stored in a secure portion of a chip, or in a secure processor, or a smartcard, or security dongle or other security device.

When the server 10 (see FIG. 1) communicates with a particular client 12 the server will know how to encrypt data or prepare keys specifically for a client by performing client specific processing steps derived from the DRM Sequencing Key that can be unique for each client. The client will know how to process the data received from the server by applying the client specific DRM Sequencing Key. This means that the server generates and uses a DRM Sequencing Key when encrypting data for a particular client or the server uses an already defined DRM Sequencing Key when encrypting data for a particular client. Of course, other non-client specific keys can be used when encrypting data and the keys can function as normal keys (keys use in standard algorithms) used in encryption algorithms such as the Advanced Encryption System (AES) and also can define the client library specific sequencing of functions applied in addition to algorithm key data.

Figure 4:
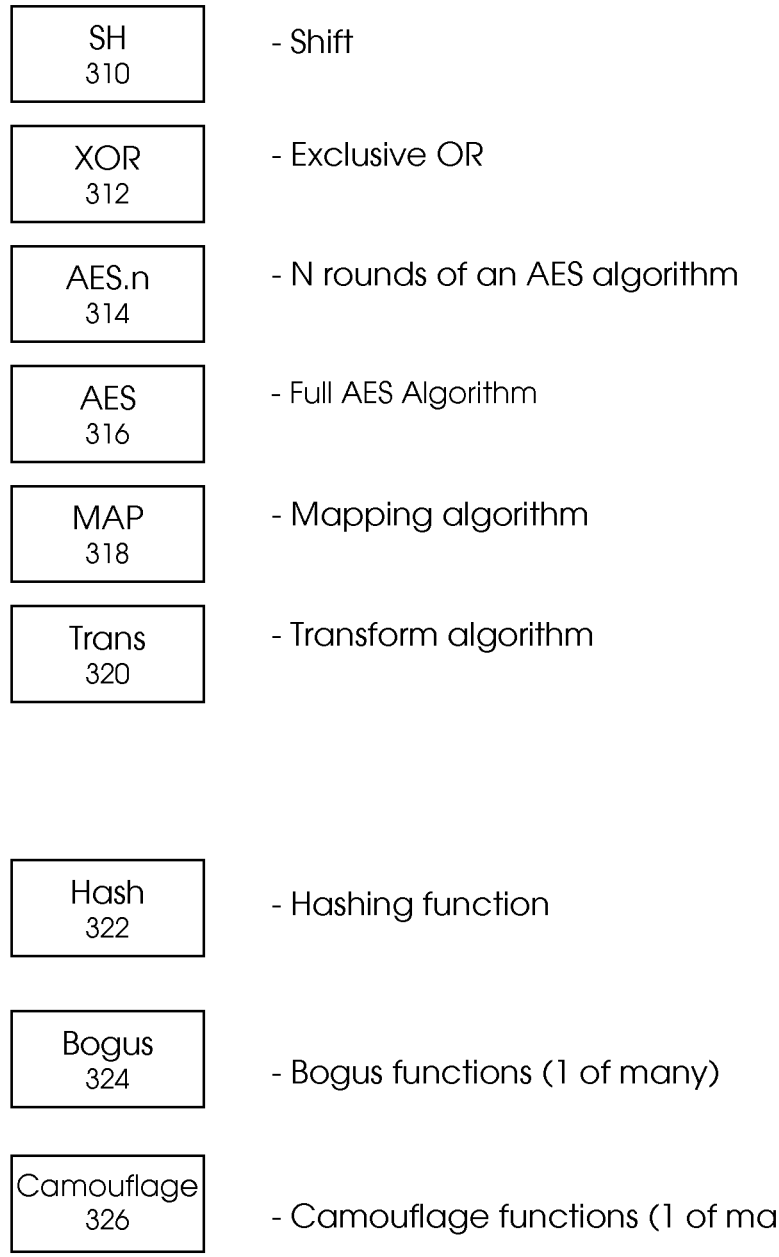
FIG. 4 is a representation of processing primitives.

The DRM Sequence Key is used to select from a number of software functions also called processing primitives, code pieces, or processing functions or transforms or processing elements which can be non-reversible or reversible functions or transforms. Examples of processing primitives are shown in FIG. 4. There can be an unlimited number of processing primitives, for example when the DRM Sequence Key is 3 bits long there can be 8 processing primitives or there can be hundreds of processing primitives that are used in a library. Processing primitives can be unique such as Exclusive Or and Shift or they can include groups of similar looking operations such as 16 different variations of a Shift Function or 32 different variations of an Exclusive Or. As used in this patent application a processing primitive can also include the entire implementation of an algorithm such as a complete implementation of the AES algorithm or a certain number of rounds of an algorithm such as 'n'-rounds of the AES algorithm (AES.n 314). By incorporating an entire algorithm such as a complete AES implementation as one of many processing sequence steps, a security audit of the DRM process will reveal that the DRM is at least as strong as the AES encryption algorithm combined with additional client unique obfuscation techniques and processing steps. Of course, one could combine multiple trusted secure encryption algorithms to enhance the fundamental security strength of the DRM. An example of this is using both AES and triple-DES as two of the many processing steps in the DRM processing sequence.

In FIGS. 2 and 3, the core processing pieces described above can be made more secure by adding encryption with one or more keys to the processing pieces. For example, as shown in FIG. 3, the Sequence Data 160 can be encrypted with a Sequence Data Decryption Key 162 and knowledge on how to decrypt the Encrypted Sequence Data (160) will be required to perform the correct processing. The Server as shown in FIG. 2 will encrypt Sequence Data 60 using Sequence Data Encryption Key 62 and encryption algorithm (not shown) when sending the Sequence Data 60 to the client and the client code library 100. Even though the Sequence Data 160 may be sent over a secure and encrypted communications link, a hacker will need to trace the decryption of the Sequencer Data 160 to understand the operation of the client. When the encrypted Sequence Data 60 is received by the Client Code Library 100 in FIG. 3, the appropriate Sequence Data Decryption Key 162 will be used to decrypt the data. Accordingly, the client includes Sequencer data decryption module 130. The Sequence Data Decryption Key 162 can be part of the Client Library code stored in an obfuscated manner, or it can be contained in a Smart Card (secure processor, secure memory or the likes), or it can be delivered using a unicast message from the Server, or in any other manner. There can be more than one Sequence Data Decryption Key 162 and the Sequence Data (60 and 160) encryption and decryption can use one or more encryption algorithms with all of the Sequence Data (60 and 160) or only portions of the Sequence Data (60 and 160) being processed by any one of the encryption algorithms using one or more decryption keys.

In FIGS. 2 and 3 the Functions (F1 151 through Fn 159) shown in both diagrams can be encrypted using one or more encryption/decryption algorithms and using one or more encryption/decryption keys. In FIG. 2, two Function Encryption Keys are shown in element 64 and 66 and each one of these keys can be used when encrypting a Function. Likewise, FIG. 3 shows two Function Decryption Keys in elements 164 and 166. Any permutation or combination of methods and keys can be used to encrypt and decrypt the actual Functions. For example, there can be two different encryption algorithms used with two different keys, or one algorithm with one key, or two algorithms with one key, or three algorithms with three keys. The Server side processing in FIG. 2 and the Client Code Library in FIG. 3 will know how to apply the different Function encryption methods and keys. The way each side knows how to encrypt/decrypt the Functions can be defined in any way determined by the programmers programming the code for these elements. There are an unlimited number of ways this programming can be performed and a few examples include the following:

1. Uses algorithm 1 to encrypt every other function, algorithm 2 to encrypt every second Function when two algorithms are used to encrypt/decrypt the Functions.
2. Use key 1 with algorithm 1 for the first 10 Functions, key 2 with algorithm 2 for the next 10 functions, key 3 with algorithm 1 to encrypt the next 10 functions and so on.
3. Use key 1 to encrypt/decrypt all odd functions and use key 2 to encrypt/decrypt all even functions when using a single key.
4. Use key 1 and algorithm 1 to encrypt/decrypt Function 1, 4, 8, 12, . . . . Use key 2 algorithm 2 to encrypt/decrypt Functions 2, 5, 9, 13 . . . . Use key 3 algorithm 3 to encrypt decrypt functions 3, 6, 10, 14 . . . , etc.

It is also possible to use Public/Private Key encryption (Public Key Infrastructure PKI) to encrypt the Functions. This would require either hardware support or a fast CPU that can perform PKI decryption quickly, or the library can be decrypted when the library is initialized or at runtime.

When the Functions are encrypted using one of the methods discussed above there will be a Function decryption step added by the client library that can occur at run-time execution or at library initialization, or at certain points during library execution such as just prior to execution of the function. One method of adding Function Encryption/Decryption is to have the Server encrypt the Functions using the Sequencer instruction Encryption block or module 40 to encrypt each Function using the appropriate key and algorithm. The encrypted Functions will need to be decrypted and the Client Code Library 100 (FIG. 3) will have a Sequencer Instruction Decryption module 140 to decrypt the Function using the appropriate Sequencer Data Decryption Key(s) and algorithm(s).

FIG. 4 below shows an example of some Functions and how they are stored in the memory of the server 10 and the client 12. For example, at the memory address for Function 1, there might be a Shift Instruction sequence (310) for performing some type of bit shifting. Function 2 can be an XOR (312) function that performs an exclusive-OR function. Function 3 is a partial implementation of an AES algorithm shown as AES.n (314). Function 4 is a complete AES (316) algorithm including all rounds. Function 5 is a Mapping Algorithm 318 that maps input data to output data. Function 6 is a Transformation Algorithm 320 that performs any sort of transform, shifting, shuffling, etc. Function 7 is a Hashing Function 322 that performs a cryptographic or normal hash computation. FIG. 4 only shows 9 functions for ease of description. However, hundreds or even thousands of functions can be included in the libraries.

The Functions as shown in FIG. 4 and described elsewhere in this patent application can be further decomposed into smaller units and the processing performed will execute the appropriate smaller functional pieces necessary to correctly process the data. For example, the AES Algorithm 316 can be decomposed into 30, 40, 50, or more, smaller functions. Therefore, each functional block such as F1 thru Fn can be a functional processing block containing a complete algorithm or a piece or fragment of an algorithm such as a single line or portion of source code in a multiple source code line algorithm.

Another aspect of this invention is to optionally include "Bogus" Functions (324) that are not used or maybe used to flag hacking attempts to add additional complexity to the Functions that comprise a client library. When used to flag or indicate hacking attempts a Bogus Function will set an indicator that a function that should never be executed has been executed most likely due to a hacking attempt.

FIG. 4 also shows Camouflage Functions 326 that are added to make the code more difficult to understand. In fact, the Camouflage Functions can be more recognizable Functions than say the Functions actually called. One of the many Camouflage Functions can be a text book software example of say an entire AES algorithm operating on data that is not part of the DRM process, while the actual AES process used in the DRM processing does not look like a text book algorithm and can be decomposed into dozens of sub Function pieces. There can be a number of similar looking or identical Functions (operating on different data) contained within a client library in addition to numerous Bogus Functions and Camouflage Functions. This means that there can be a number (for example 12) of very similar code pieces with each code piece performing a part or all of a function, and there are slight differences in how each different version operates on data or accesses data and these different (for example 12) different versions are spread throughout the client library. Because there can be a number of similar looking functions in the client library there will not be one location point of where to locate code for a particular function. If a hacker is looking for code to locate the AES decryption he may find 12 or 24 or 36 different versions of code that looks like it can be AES decryption code. There can be a number of different hash functions, different Bogus Functions, different Camouflage functions, and a number of similar looking functions for each Function used.

Figure 5:
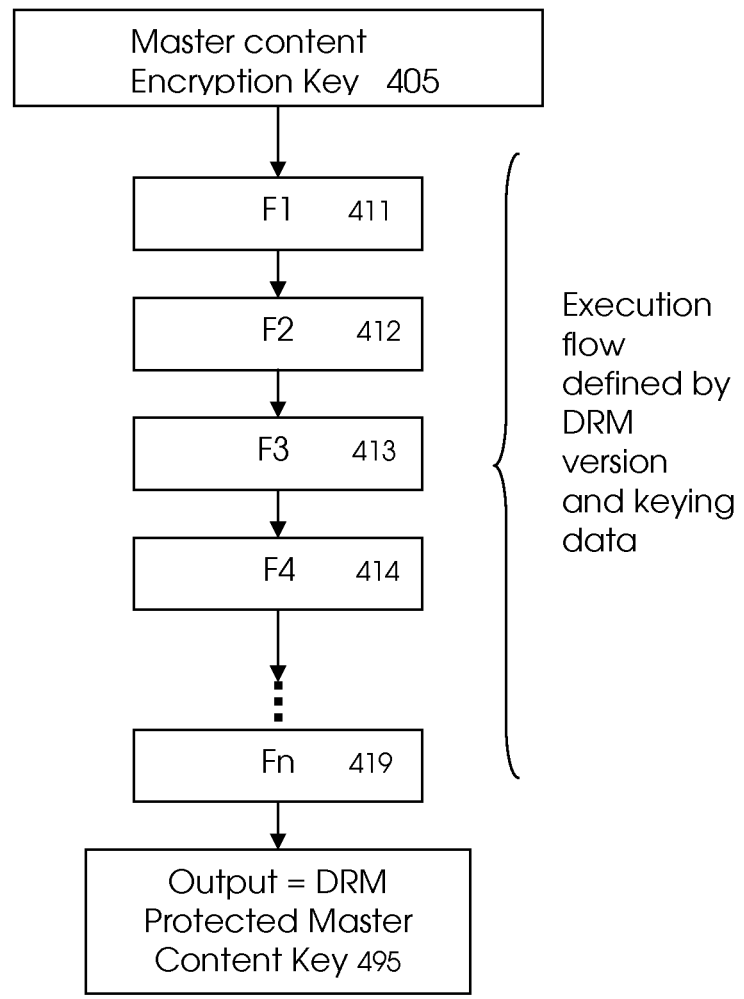
FIG. 5 shows the processing steps performed in protecting data by the DRM Process.

FIG. 5 shows the processing steps performed in protecting data by the DRM Process that can be performed by the server 10 of FIG. 1. In this example the input data is a Master Content Encryption Key 405 for a piece of content. The Master Content Encryption Key 405 is then processed by a series of functions Function F1 411 through Function Fn 419. The Functions perform cryptographic functions, transforms, mappings etc. to protect the data as described in other areas of this patent application. Any number of functions can be executed and the functions are selected from the functions described in above in connection with FIGS. 2, 3 and 4, and other functions. In FIG. 5 the nomenclature F1 411, F2 412, F3 413, F4 414 is used. However, in the actual implementation the numbers will not be sequential but will be more random.

The DRM process of encrypting the Master Content Encryption Key 405 for a piece of content is used to protect the content key from hackers attempting to steal the content. Master Content Encryption Key 405 has a series of functions performed on it to generate a DRM protected version of the Master Content Encryption Key 405 and is referred to as the DRM protected Master Content Encryption Key 495. While FIG. 5 shows the DRM process being applied to a Master Content Encryption Key 405, any data can be processed by the steps shown in FIG. 4, and the process is not limited to only a Master Content Encryption key. For example, any type of data used in a system can be input at step 405 and processed and output at step 495.

In FIG. 5 the steps are labeled as functional steps F1, F2, F3, . . . Fn. The functional designators F1, F2, F3 and so on are used to indicate a series of functional steps being applied to the data. In actual fact the functions F1, F2, F3, to Fn will be functions determined by the DRM Sequence Key and because the actual sequence of functions can be defined by the DRM Sequence Key the sequence of processing steps is programmable.

Each function block can be further decomposed into smaller functional blocks and the function block processing can be performed without additional data (keys, variables, transform data, constants, etc.) or with additional data (keys, variables, transform data, constants, etc.) being applied to the functional processing block.

These embodiments allow the Server of FIG. 2 to apply a unique DRM process to each piece of DRM protected data being sent between Server and Client. By changing the Sequence Data Key (FIG. 260) the DRM process applied to the data being protected will change. This means that by changing the Sequence Data 60 the actual DRM processing functions and optionally the keys used will change as well. Each individual client performing the processing steps as shown in FIG. 5 can use separate or common keys and even separate virtual machine or encrypted state machine processing methods or instruction sets. Each separate virtual machine or encrypted state machine can be individually encrypted using client unique keys or key common to all clients.

The table below presents a logical decomposition of the DRM Sequence Key mapping to DRM process functions codes (similar to addresses or states or virtual machine instructions) whereby DRM Sequence Key data is used to indicate the sequence of functions applied as part of the DRM process.

| Function Block Decomposition Required processing |
|---|
| F1 = XOR Data byte with Key bits 3, 4 |
| F2 = Shift right 3 bits |
| F3 = Map using map functions 8 |
| F4 = Transform using transformer function 17 |
| F5 = Complete 128 bit AES encryption algorithm |
| F1 = Code Piece 33 |
| F2 = Code Piece 137 |
| F3 = Code Piece 8 |
| F4 = Code Piece 246 |
| F5 = Code Piece 227 |

Figure 6:
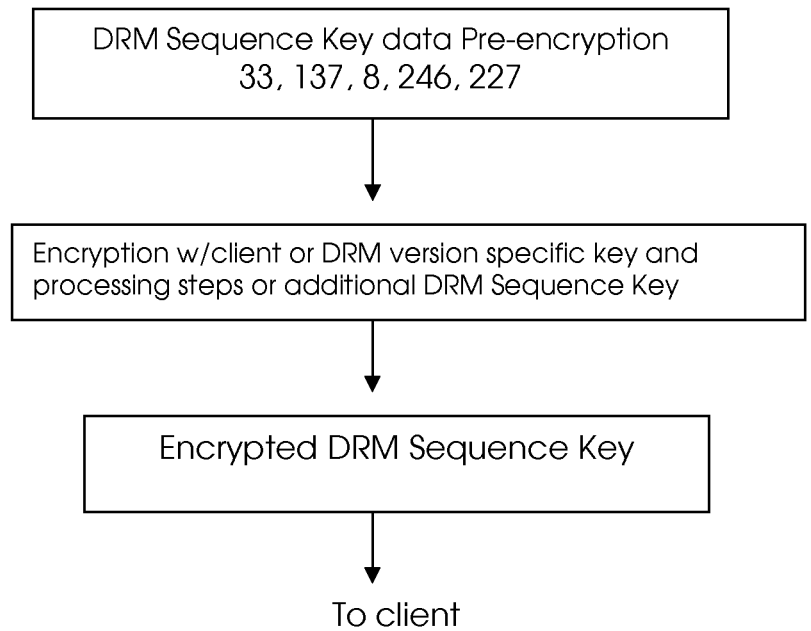
FIG. 6 is a flow chart of a process for encrypting the DRM Sequence Key before it is sent to a client.

As shown in FIG. 6, the DRM Sequence Key (Sequence Data 60 and 160, FIGS. 2 and 3) can be encrypted and sent to the client, for example, by the server. Encryption can be client unique or common to a group or all clients. Alternatively, the DRM Sequence Key can be sent to the client unencrypted or encrypted using SSL. The protection of the DRM Sequence Key can also use the processing described herein. The DRM Sequence Key can be encrypted using another DRM Sequence Key used to protect the DRM Sequence Key for the Master Content Encryption Key for example. This means that each key or each piece of data in a system can be protected by client unique DRM Processing defined by the DRM Sequence Key data.

The method of sending the DRM Sequence Key that is used to indicate the sequence of steps that should be used to process encrypted data can itself be protected by the additional DRM Sequence Key data. The protocol between client and server can use a protocol layer DRM Sequence Key to generate a client unique protocol layer of encryption. Of course, embodiments can be used for many types of encryption/decryption application and the techniques can be reused within the same library to protect different portions of the library.

Figure 7A:
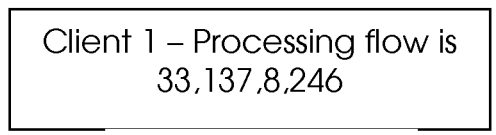
FIGS. 7A, 7B and 7C are representations showing the sequence of functions applied to the Input Data by three different clients.
Figure 7B:
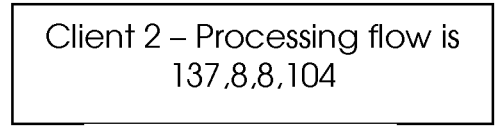
Figure 7C:
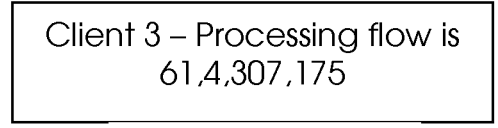

FIGS. 7A, 7B, and 7C represent the way three different clients apply the DRM process by showing the sequence of functions applied to the Input Data by each client. In FIG. 7A, Client 1 applies the functions 33, 137, 8, and 246 to protect the data and the sequence flow is partially or fully determined by the Sequence Data (FIG. 3, sequence data 162). In FIG. 7B Client 2 applies the Functions 137, 8, 8, 104, while Client 3 performs the DRM process by executing Functions 61, 4, 307, and 175. Each of the Functions identified in FIGS. 7A, 7B and 7C can have minimum encryption strength equal to a well known secure encryption algorithm. The actual processing necessary to decrypt (and hack) data will be unique for each client. In FIGS. 7A, 7B, and 7C client specific DRM processing is performed uniquely because Sequence Data is unique, or the memory layout of the client library (including the memory layout of the Functions) is unique, or both are unique.

In systems that use Smart Cards, it is possible to add some or all of the sequencing data, key data or state machine data used by a client to the Smart Card. Alternatively, a smartcard based system design can be such that both Smartcard data and other data external to the smartcard is required.

Figure 8:
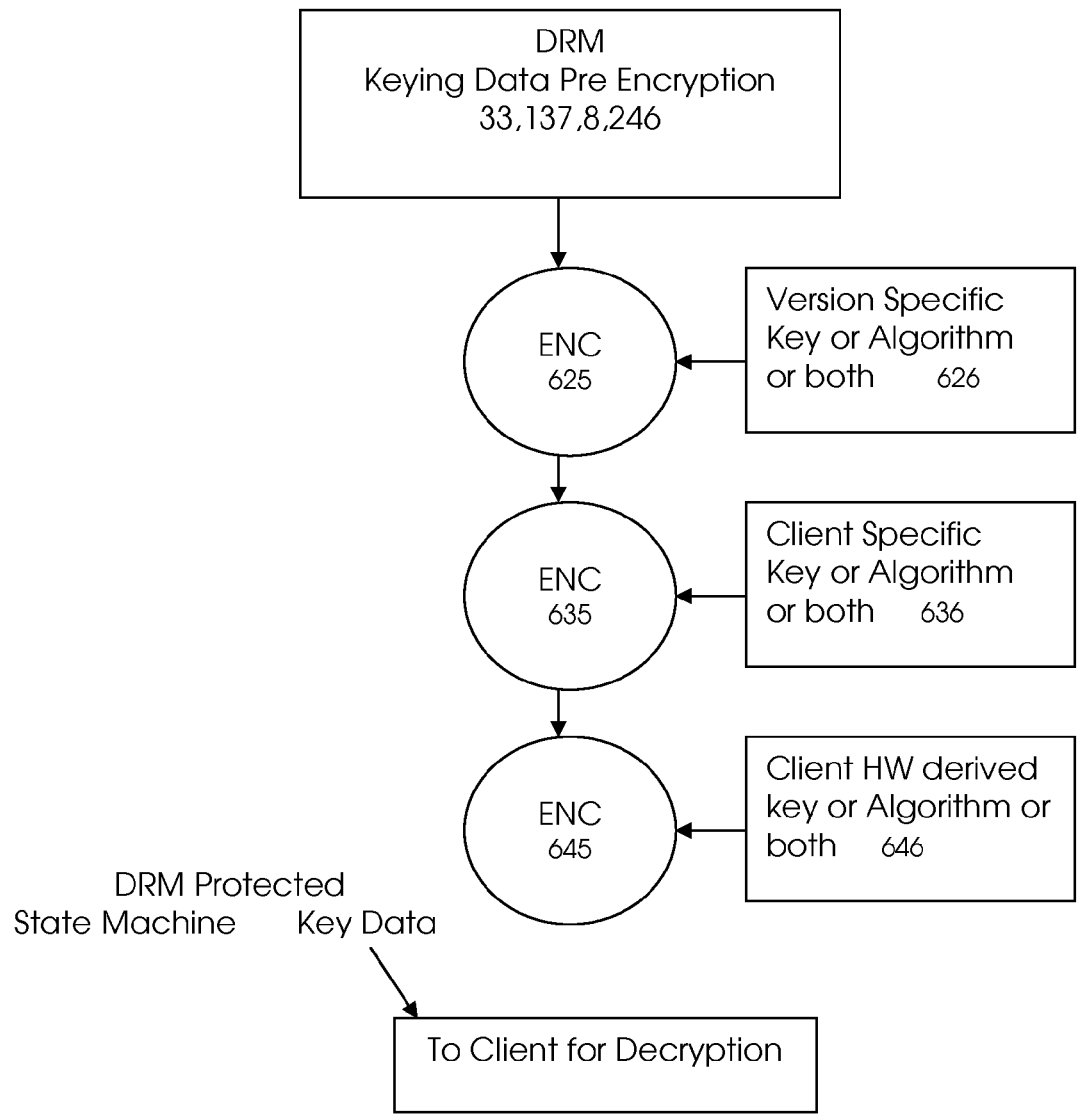
FIG. 8 is a flow chart of a process for encrypting the processing flow from FIG. 7.
Figure 9:
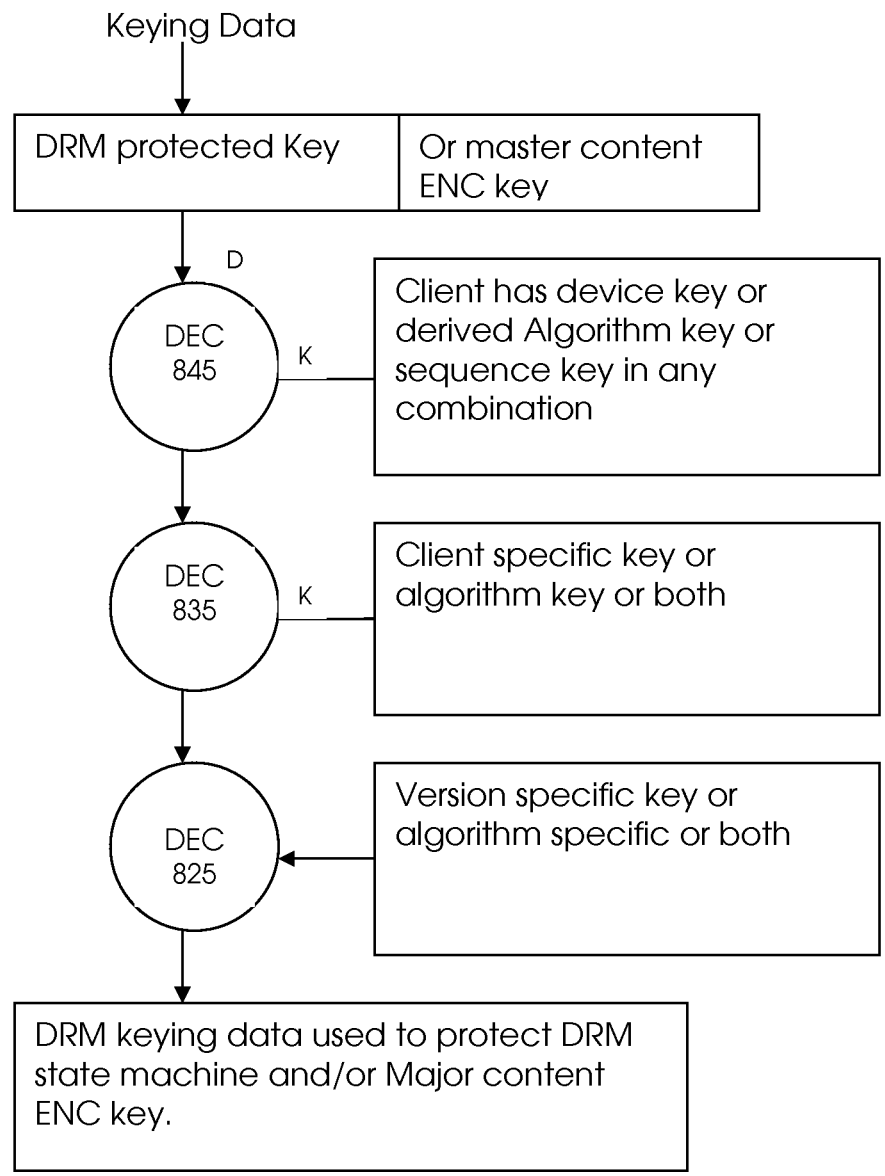
FIG. 9 is a flow chart of a process for reversing the process shown in FIG. 8.

FIG. 8 is a flow chart of a process for encrypting the processing flow from FIG. 7 which can be performed by the server. In FIG. 8 Elements marked 'ENC' (625, 635, 645) can be either state machine, state tables, or Data used to derive processing flow, Virtual instructions, or code that can execute on the device CPU or in the device smartcard (if any) and can be local to the device firmware or downloaded into the device. 'ENC' (625, 635, 645) can be encrypted when stored in memory and decrypted only when the processor is executing or processing the step shown for example 625. The processing represented by FIG. 8 (elements 645, 635, and 625) will be reversed by the client processing steps represented in the flow chart in FIG. 9 as elements 845, 835, 825.

Referring now to FIG. 10, FIG. 10 is a representation of the process for protecting the master content encryption key 1310 (or other data) which can be implemented by the server. The DRM process keying block 1320 includes code, data (state machine or sequence or keying or other) or virtual instructions used to define the sequence of keys and data processing (1330) applied to protect the master content encryption key 1310 or any data. DRM process keying block 1320 and/or DRM process instructions state machine, virtual machine instruction processor or sequencer collectively or individually called DRM Process 1330 can also be encrypted in any manner to further obfuscate client library processing. The DRM Process Keying data 1320 used to define the DRM process can also be encrypted using the methods defined herein. By modifying the DRM Process Keying data 1320, the data processing steps will change because the DRM Process Keying data 1320 defines the sequence of processing steps used by the DRM Process 1330.

In one embodiment each client library is unique in the way it executes the processing applied to protect input data (the DRM process (FIG. 10, element 1330). The DRM process keying (FIG. 10, element 1320) can also be unique for each client applying any of the techniques described herein to both DRM processing keying (1320) and the DRM process (1330). Doing so provides a more obfuscated execution environment than when only DRM process (1330) uses these techniques. Therefore, the DRM process keying (1320) can have its own keys and process flow and this makes the key processing and client processing unique in addition to the DRM process to protect data 1310 being unique. Hackers will be forced to hack both the DRM process keying data 1320 and DRM process 1330 blocks to hack a DRM. Each block (1320, 1330) can be unique to a client with unique encryption applied to the runtime code for each client or each content download or any other granularity. This means that the DRM Process Keying 1320 can also be keyed using additional keying data (not shown) that is used when sequencing the steps that need to be performed to apply and remove the DRM protection. Likewise, the way DRM Process 1330 executes its DRM Process is by using sequence data in the form of DRM Sequence data (or Process Keying 1320 data) and the way DRM Process 1330 actual processes the DRM Process Keying 1320 internally can be also be keyed (not shown). The techniques described herein can be applied recursively to protect key data and sequence data and any other data and to obfuscate the internal processing of each data item being DRM protected using the processes described herein.

In one embodiment the VM instruction set is keyable for each client as is the VM instruction sequence used to define the DRM applied to a key or client. A keyable VM instruction set is one where the instruction set is encrypted using a key or the execution sequence performed by the VM is controlled by a key, or both or an encryption key for encrypting the instruction set and a different key for controlling the instruction sequencing execution flow. The DRM processing sequence is keyable along with the VM instruction set with both being uniquely keyable for each specific client device or piece of content or both.

The DRM Sequence Key data can be encrypted by the server and decrypted in the client at run time. The method of encryption and decryption for the DRM Sequence Key data decryption can change over time. This forces hackers to restart client library hacking. DRM Sequence Key processing, DRM processing, and client library can all be unique for each library, or any one of the items can be unique for each client.

The DRM Sequence Key data that is encrypted can be encrypted using PKI keys or keys generated by a Diffie Hellmen sequence, or a combination of PKI and/or Diffie Hellmen and/or client specific key generation code.

By applying the DRM Keying process to each phase of the DRM Processing in a multiple phase design, the DRM designers can use different virtual machines along with the same or different keying methods for each phase of processing forcing hackers to have to reverse engineer multiple encrypted VMs. Each piece of the DRM Processing can use separate encryption to enhance security.

The systems and methods described herein can also be used to protect data stored on a client in a client specific way. For example, a master content key used to protect a movie file that can be viewed without a network connection (off-line DRM) can have the content specific keys data needed to decrypt the movie stored using client unique processing steps. This is achieved by using the DRM Sequencing and having Sequence Data unique for each movie download performed by a client. As such, the decryption keys for each piece of content on any one client will be unique for each piece of content, and in addition the client library for each client device can be unique. In such an arrangement the results of a hack can be isolated to one piece of content for one client, rendering global DRM hacks unlikely.

These systems and methods can also be applied for smart cards with a VM instruction set keying algorithm in the smart card. The client using the smartcard (for any type of data including ECM/EMM data) will use Sequence Data internally within the smartcard to prevent static analysis of a smartcard and to prevent static analysis of the client code interfacing to the smartcard because decryption keys will be necessary and the decryption keys will not be part of the native library but will be part of the DRM Sequence Data or other data sent from the server.

Within the design of the systems and methods described herein there can also be included code spies. Code spies are pieces of code or functions that either collect data for subsequence reporting back to the server, or they collect data that is used during the run-time processing within the client to establish conditions that will be used to detect hacking attempts. These conditions will be reported back to the head end of a content distribution system (or other appropriate recipient) when hacking is suspected, or will create data that is necessary for the correct execution of the client software. For example, a code spy can obtain a hardware register value that includes for example a serial number and then the serial number is hashed so it is non-obvious and then the hashed serial number is stored away in memory at a certain time or after a certain event. Then, either at the same time the spy data was collected (serial number read and hashed) or preferably at a later time another code function will use the spy data or will report the spy data back to the server allowing the server to do server side clone detection. Code pieces can also have place holders for data necessary to personalize a code piece to do something new and unexpected by the hacker and the activation of the code piece occurs at random times or every time the client runs.

One example of a code piece place holder operates as follows. For the first 10 days of client library operation the hacker sees a piece of decoy code that reads a memory address and the data at the memory address is used in unimportant (decoy) ways in subsequent client library processing. The decoy code is the default processing path as determined by the DRM sequence key data. At a later time the DRM Sequence key or data will changes and the change invokes new code that probes the client (spy code) to detect tampering. For example, during the first 10 days of DRM processing the decoy routine collected data that looks innocent (not reading chip specific or client specific data) and it appears to perform a static data read and write, BUT on the $11^{th}$ day of operation or when the DRM Sequence Data changes such that the decoy memory access code is not executed and a new piece of code runs that is called the spy code. The spy code will read client hardware related Identification Data or a Serial Number or a MAC address or a Quantum Data that then gets reported back to the server or head end or is used to detect a clone such as the client device Serial Number not matching the Serial Number used in other parts of the system processing because it was spoofed by the hacker when they hacked the library when observing the library observation during the first 10 days. Data on the server side or client side will be used to check the spy data to see if it is correct and has not been tampered. There are unlimited ways that spy code can be added to the client library and spy code processing can remain dormant until a trigger event such as the changing of the DRM Sequence data or a client library internal event occurs. Decoy code functions and pieces are preplanned client library or DRM processing steps or functions that can be used in processing DRM steps or to collect data (spy data) used by the client or server to detect client library hacks and clones.

FIG. 11 is a simplified block diagram of a client specific Virtual Machine or Sequence Data being uniquely encrypted for a particular client. The VM data key 1240 will be used by the client to decrypt the virtual machine or sequencer data flow or both. This VM Data Key 1240 can be delivered to the client in a unicast delivery to each client, or using a multicast delivery broadcast to one or more clients, or using data obtained from a smart card in the client and as such was predelivered during smart card initialization, or by using any other data exchange mechanism. The VM key data 1240 can be unique for each client. The VM key data can be one or more keys.

In a further embodiment there can be a number of keys for code pieces, the virtual machine, run time integrity checking codes and run time security extensions. The keys or data can be protected with different encryption algorithms for each key or data item used in the system. For example, the key block for an element can use multiple encrypted and obfuscated keys to encrypt the code pieces of the client library. Therefore, the encryption of that element will consist of one or more keys and, for example, the code pieces being protected by these keys can each use a different encryption/decryption algorithm. As an example the processing using key 1 of the multiple key sequence can use AES-ECB mode encryption and the second part of the processing using key 2 can use a different algorithm such as triple-DES. Key 3 will use Blowfish, key 4 AES-CTR mode, etc. The use of multiple keys for any one processing block or any data, as mentioned above provides for more security layers that must be hacked to successfully hack (or understand) the processing performed within these blocks or for the protection of data.

For illustrative purposes assume that the sequence flow data is 88 bytes in length. The encryption of DRM sequencer flow data does not need to use only one key or even one encryption algorithm, rather the sequencer flow data can use a combination of encryption algorithms such as AES for the first 256 bits (32 bytes) of the DRM sequencer flow data and then triple-DES or the next 192 bits (24 bytes) of DRM sequencer data, followed by Blowfish for the next 256 bits (32 bytes), etc. etc. A single key can be used for each of the three different encryption algorithms used to protect the 88 byte DRM sequencer flow data in this example, or multiple keys (2 or 3 or more) can be used to protect the 88 byte sequence with each algorithm operating on a portion of the DRM sequencer flow data having its own key.

In some designs, the client key 1242 in FIG. 11 does not need to change on a client by client basis and can be a common key for groups of clients or all clients. However, the systems and methods also support designs where the client key 1242 in FIG. 11 can change on a client-by-client basis, or on a regional basis, or a head-end (or server) basis, or a country basis, or any other granularity desired by the DRM software designer. Embodiments also allow for the different client key 1242 and DRM Processing methods to be unique for each client or region or whatever without having to change the client library software design. As such, multiple different DRMs are derived from one software code base using the techniques described herein.

When a change is desired to the DRM Processing method, the VM keying data can be used to not only key the VM but can also select 1 of N VMs or sequencers when multiple VMs and decryption algorithms are built into a single client library code image. This will allow a single client to be distributed to a client device wherein the single client contains multiple DRM processing methods that can use different keying and decryption algorithms. After client library release a first DRM processing method and associated keying data and decryption algorithm is used while the other DRM processing methods and VMs in the client library remain dormant until there is concern that the first DRM processing method being used has been compromised. As such, the single client library can also contain different Virtual Machines or Sequencers that are dormant as well and when the DRM keying changes a very different run time execution environment is activated when compared to the operation of the client library when the first DRM processing and keying methods were used. This very different runtime environment results by changing one or more of the following: DRM keying; or the VM or sequence selected; or the DRM processing keying. This allows client libraries to be built that can change in the event of a hack or security breech in the first used DRM processing method without having to download a new client library DRM. Because the client library will use keying data external to the client library and a hacker will not be able to hack the dormant DRM processing methods until activated by the server.

We will now briefly describe one embodiment of a development environment.

Create 50 to 100 software Functions (FIG. 2 F1-151 through Fn-159) or code pieces that can be used to implement the DRM processing.

In a preprocessor change (e.g., morph or decompose) the 50 to 100 code pieces into a larger number (say 1000 or more) code pieces or Functions or Function pieces. Alternatively, simply write code for dozens to hundreds of code pieces wherein only the code pieces that will be required by the DRM processing need to be tested. Code pieces that are not part of the DRM process but are simply camouflage do not need to be tested as part of the DRM process and can be tested to merely make sure that they do not hang the system. One can make the camouflage functions look more real than the actual functions used in the DRM process. For example, a camouflage AES algorithm can use an open source licensed 'textbook' version of an AES algorithm and the actual AES algorithm used by the DRM process can look completely unlike a text-book version without 'text book' algorithm coding techniques that are easily identified. Additionally, camouflage functions can be activated when the main processing code detects a hacker is tampering with code. The client library will run the camouflage code provide code execution paths that are not the real DRM processing code and simply send the hacker down the wrong processing path.

Build one or more sequencers or Virtual Machines that can sequence through the code pieces to execute a DRM processing sequence with the processing sequence defined by the DRM Sequence Data.

Test the sequencer(s) and DRM process

Build one or more sequencer encryptors that encrypt the above sequencer, or sequence control information or sequencer data or code pieces where the decryption keys and/or execution are "keyable" and can be downloaded at runtime to a device and not statically embedded in the code firmware image.

Optionally include one or more code piece spies that can be activated by sequence keying data from the head end. The code piece spies can be used to detect hacked software and optionally report client hack and related data that can be used to detect tampering and report clones to the server or use such data in the client or both. Spy code can also deactivate the correct DRM Sequence Key processing path and execute camouflage code included in the client library.

Many of the 1000s of code pieces can lie dormant until DRM sequence keying data indicates it should run. Additionally, execution path 1 for the DRM processing can use one set of code pieces and then after a certain amount of time the DRM processing will use different code pieces from the 10s or 100s or 1000s of code pieces in a library. This in affect allows one library code image to contain different versions of DRM processing and allows the DRM processing to change without a code library update. If the code libraries are further encrypted, the various different DRM processing sequences contained within the code library can use different encryption keys and processing. When the DRM processing changes, it changes to a set of library functions and decryption keys that have not been available (or seen) by the hacker until the change is made.

An enhanced version of the system changes the VM instruction execution protection encryption/decryption based on DRM keying (or sequencing) data either embedded in the code library or dynamically sent from the server at run time or when a trigger is sent to activate or change the VM instruction sequencing or sequencing protection/obfuscation The library design can include activation triggers (or control bit changes) activating a new decryption path in the VM or new VM instruction or new VM addressing or data access or any of the above. This means that the library can change the way the code image decryption is performed based on input data or an event detected by the client or server or both. For example, for the first 60 days of operation the code image decryption path uses a path containing 128 bit AES for decryption, and on the $61^{st}$ day the code library will execute different code that uses triple-DES decryption of different code in the library. Because the key necessary to decrypt the code library for the triple-DES encrypted code is not contained within the client library, the hacker may not have detected that there is triple-DES encrypted code and a triple-DES code decryption library activated at some point. The hacker cannot brute force attack the triple-DES code image because it is first compressed and then encrypted and the process of compressing the code image greatly increases the difficulty of a brute force attack. The hacker does not know when the code will be enabled and what the code will do, and what spy data (if any) is contained in the library. In essence, the incorporation of two or more code images encrypted with two different keys or encrypted in two different ways puts a ticking time-bomb in the client library that will contain code that the hacker has not been able to hack.

In one embodiment, the above is expanded to include a binary code compression process or other obfuscation process which is performed before the encryption of the library such that the distributed client library contains compressed binary code before encryption. This makes dictionary and brute-force attacks based on instruction set knowledge more difficult because the encrypted data is compressed or obfuscated.

Additionally, spy functions can be added that can be used as described in the spy code section above. Spy data can be in many different forms and a few examples include how many movies were watched, time interval between certain channel changes, when the client first powered on, etc. and other types of quantum data can be used to perform clone detection. The quantum data can be generated using code images that have unique encryption making each one different. For a particular client it can be different from another client, in that as described above a hacker can only reverse engineer a portion of the library because the client library does not have the keys embedded within it to decrypt the other portion of the client library. One method of delivering the client library is to not even include client code decryption keys for the first operating portion of the code within the client library and to require a client library or Function Encryption Keys (FIG. 2 64, 66 and others not shown) obtained at client runtime forcing the hacker to have to extract the code image decryption key from a client while the client is running. And, because there can be two or more different Function Encryption Keys used to build the library, the hackers will be forced to rehack (repeat the runtime library hacking in a non-static environment) the client libraries when the Function Decryption key being used changes.

Because the Sequencer or VM is a major attack point from the hackers, the software design in this area can use so called "best practices" methods of software protection including:

Digitally signing each code image;

Run-time code integrity checking that verifies the code has not been modified, debuggers have not been attached, code breakpoints have not been inserted;

Protecting different portions of the client library using preferably multiple encryption keys and multiple Sequencing keying data and using multiple encryption/decryption algorithms;

Encryption algorithms change based on Sequence Data or event data;

Further obfuscate invention keys and data by using client specific one-time pads;

Keys select new execution path within the VM/Sequencer;

Dormant sequence paths become activated based on key data to allow unhacked processing paths to become active after a certain time event. For example, 90 days after the library is released;

Preferably compressed software code images are encrypted to increase the difficulty of a brute force attack;

Multiple encryption/decryption algorithms are used to decrypt software code image with decryption keys not stored in the client library; and It is possible to generate new libraries for the client using only a post compile time process that will be described in other sections of this patent application.

Figure 12:
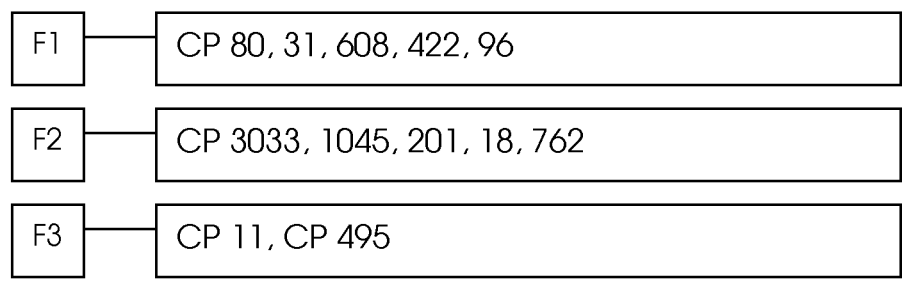
FIG. 12 is a graphical representation of the decomposition of three functions.

One element of the systems and methods is the decomposition of Functions into code pieces. This can be done in a number of ways. FIG. 12 is illustrative of one way and shows the code piece sequence maps for 3 functions labeled F1, F2, F3, such as the functions from FIG. 2.

Function F1 in FIG. 12 is includes code pieces (CP) 80, 31, 608, 422 and 96. Of course, the decomposition of a function into code pieces can include additional code pieces. The preferred method of client operation is to have no static call tree exposed that can be exploited by hackers. Therefore, there are no calls from CP80 to CP31, or from CP31 to CP608, etc. in the client library software. Rather, there are collections of Code Pieces that have a form of return instruction or a linkage mechanism that allows sequence data to define the actual sequence of code pieces that must be performed to correctly remove the DRM processing. The DRM Sequence data to execute F1 would be address or index or data indicating/identifying that Code Pieces 80, 31, 608, 422, and 96 need to be executed. Likewise, Sequence Data for Function F2 would indicate code pieces 3033, 1045, 201, 17, and 762. An optional design element is that some of the code pieces can be paired to reduce the size of the Sequence Data such as for Function F1 CP 80 has a call to CP 31 allowing two pieces of code to be executed by Sequence Data indicating CP80 should be run. When CP31 is finished there is no call to CP608 because this would provide hackers with the capability to link CP80, 31 and 608 together as part of the hacker's static code analysis. Preferably, each code piece is its own island, standing along with no linkage information indicating the call sequence of code pieces for a function.

Additionally, because functions are decomposed into code pieces, it is possible to include a code piece scrambler that scrambles the order of code pieces used to implement DRM functions. The server retains data on the shuffled code piece code image delivered to a client device and knows how to prepare the DRM Sequence Key for a particular client. The functions F1, F2, and F3 shown in FIG. 12 represent how a function can be decomposed. For example, if Function F1 is all the processing rounds of an AES Encryption algorithm than CP80, CP31, CP 608, CP 422 and CP 96 will be the code pieces to implement one-round of the AES algorithm or all rounds of the AES algorithm. When the code pieces represent only a portion of an algorithm, say one round of the AES algorithm, then DRM Sequence Data can also include data that indicates the number of times to execute the code pieces. For example, if 32 rounds of an AES algorithm are desired and the decomposition is such that F1 is one round, then the Sequence Data can include data that indicates that 32 rounds of F1 should processed. Additionally, code pieces may include processing to schedule keys and data when the Function decomposition is for a single round of an algorithm. For example, CP 608 may include a data check to examine which round is being performed and access the round specific data.

An interesting element of the decomposition process is that Code Pieces or Functions can be scrambled after software compilation and testing by a separate post software development process that scrambles Code Pieces. This process is similar to a linking step that not only links the object or binary versions of the Code Pieces but it also "keys" the code pieces by arranging the Code Pieces in a manner that will allow the server to apply the appropriate processing to the DRM addition process that will correctly be decrypted by the DRM removal process performed in the client. The scrambled order of the Code Pieces in the client library will be known by the server and the server will apply the encryption using a process (keying or sequencing) that can be correctly decrypted and processed by the client. In one example a DRM Sequence Key is also used and the DRM Sequence Key will be appropriate for the way the Code Pieces are scrambled. For example, Function F1 in FIG. 12 was decomposed into Code Pieces 80, 31, 608, 422 and 96. This ordering of Code Pieces can be delivered to Client 1. However, other clients can receive scrambled libraries when compared to other libraries. For example by using a post compilation and software testing scrambling process can scramble the code pieces so that the memory layout of each client library is unique. For example, a software library whereby the code pieces for the compiled and linked tested version of Function 1 can be scrambled post compilation as shown in the table below:

| Client Number | Code Piece Ordering In Client For Function F1 | | | | |
|---|---|---|---|---|---|
| 1 | 80 | 31 | 608 | 422 | 96 |
| 2 | 201 | 81 | 93 | 17 | 3 |
| 3 | 199 | 9 | 23 | 41 | 130 |
| 4 | 4 | 7 | 109 | 18 | 86 |

In the table above the Code Piece memory address ordering is shown for four different clients delivered using the same compiled and tested source code. The Code Pieces can be scrambled before delivery to a client or during the software installation process or at any other time. In this example each client will require client unique Sequence data (DRM Sequence Data) to properly execute Function 1 on each client. The client unique DRM Sequence Data will be used to indicate the process flow to piece together the code pieces. The Client unique DRM Sequence Data for each client is shown below:

| Client Number | DRM Sequence Data before optional encryption or other obfuscation |
|---|---|
| 1 | 80, 31, 608, 422, 96 |
| 2 | 201, 81, 93, 17, 3 |
| 3 | 199, 9, 23, 41, 130 |
| 4 | 4, 7, 109, 18, 86 |

| DRM Client | Functions used in DRM processing | DRM Key Length in bits |
|---|---|---|
| 1 | 1, 5, 10 | 146 |
| 2 | 5, 1 | 139 |
| 3 | 7, 10, 2 | 138 |
| 4 | 6, 3, 12 | 140 |

As reflected in the table above, the DRM Sequence Data (DRM Keying Data) can be unique for each client when the client library code image is uniquely scrambled for each client. Additionally, when appropriate Virtual Machine Instruction set design techniques are applied, the scrambling function can be within the Virtual Machine Instruction Execution Environment. Alternatively, when a State Machine or State Table design is used for the client library, the DRM Sequence data will be applied appropriately for the design. It is interesting to note that in addition to encrypting the DRM Sequence Data, the DRM Sequence Data processing can be obfuscated on a client by client basis using client unique transform tables whereby a client unique transform is applied to the DRM Sequence Data by the server. The client will apply a client unique transform to create the necessary Sequence Data as shown above. Such transforms can be applied with any desired granularity such as for each Code Piece Sequence Data Value meaning that each client can also include a client one-time-pad consisting of one-time pad data that is used to transform the actual DRM Sequence Data on both the server and client side with both sides applying the one-time-pad. Other methods of further obfuscating the DRM Sequence Data and mapping to actual code execution can also be applied.

Another interesting embodiment includes generating different key lengths for the keys used in the system by having multiple key processing code pieces each using different size keys. The DRM Sequence Data selects the different code pieces to build DRM content keys that have different lengths. For example, in the table below there are DRM processing functions pieces that handle the number of bits in the table. The DRM Sequence Data will indicate that the DRM processing should consist of functions with 128 bits key processing plus other functions with different number of bits. The use of this optional step will add frustration to hackers because the hacker will not know the basic DRM Content Key length of the system and will have to analyze code to even determine key length. Each client can use different combinations of key lengths.

| Function Number | | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Key Length in bits | 128 | 128 | 128 | 17 | 11 | 4 | 3 | 21 | 18 | 7 | 16 | 8 | 19 |

The above table shows the number of key bits processed by each Function. Of course, each of the above functions can be decomposed into smaller pieces as describe in other areas of this patent. The DRM processing for a client will consist of at least or more of the 128 bit key processing function and one or more of the smaller number of bit key processing functions. The table below shows how the DRM Sequence Data can be used to generate DRM processing with different key lengths.

The sequence order of how the bits are processed can also vary. In addition, multiple processing chains can be used to generate more complicated DRM processing steps. For example, DRM Client 1 can use Functions 1, 5, and 10 plus other functions with identical key lengths or reuse the keys in a second pass such as adding a second pass using functions 5, 10, 1 in addition to the first pass of functions 1, 5, 10. As such, the keys will be reapplied twice (once for each pass). Of course, additional keys can be sent for each pass and in a two-pass example 292 bits will be sent when two passes of the 146 bit DRM processing is used. Multiple passes can use additional bits not used in the first pass, for example a DRM with pass 1 using Functions 1, 5, 10 and then have a second pass that uses 1, 5, 10 plus Function 12 adding 8 bits to the key length of pass 2. All of the different key lengths are created and processed by defining the sequence of Functions that are applied during the DRM processing and in this example the sequence would be pass 1 of Functions 1, 5 and 10, and pass 2 of Functions 1, 5, 10 and 12.

In FIG. 12 unencrypted sequence data is shown to the right were the numbers in each box correspond to the code pieces that are executed to perform the particular function. For added security the code pieces shown in the Sequence Map data can be encrypted using a single or different encryption algorithm using one or more keys before being sent to the client. In the example the code pieces that make up function 'F1' can be encrypted with AES for the even values of the sequence (i.e. elements 0, 2, 4, 6, 8, . . . ) and DES for the odd elements for the sequence (1, 3, 5, 7, 9). Of course one skilled in the act can apply different combinations of algorithms and different patterns to increase security. The key data used to encrypt the code piece sequence map can be derived from client specific data or delivered uniquely to each client or embedded within the library or derived from client hardware specific data or quantum data or some other means.

Also in FIG. 12, each function F1, F2, F3 for example can have their own keys for encryption and their own encryption algorithm sequence unique to each function as described in the prior paragraph for function F1.

Another application is to generate a unique software client library code image for each client device with the unique software client being derived from a common set of processing code and the server when delivering a client software or firmware image to the client, or the server in an off-line process makes the client software image unique. The techniques to make a client software library code image unique can also be applied to a client library design that uses the DRM Sequence Key methods described in other parts of this patent application. When each client library software code image is unique (or nearly so), the scope of a security hack or breech is localized to a single client or to only the devices using the same client library software image. There are many ways to generate a unique client software code image using the techniques described herein. One way is presented below to illustrate the application of the systems and methods when used for preparing unique client software library images.

1. Decompose the client software library design into a number of Functions. The Functions are algorithms or pieces of algorithms or code sequences. These are collectively referred to as the Functions.
2. Identify the starting point of each Function and the sequence flow (call order for each Function). For example, say that Functions 8, 4, 2, and 1 should be called to perform the DRM Processing. The call order 8, 4, 2, 1 is identified as well as the starting point of each of the Functions or data that can be used to identify the starting point of the Functions.
3. Test each of the Functions individually to make sure the software processing of each Function is correct and that the DRM processing is correctly applied at both the client and the server side.
4. Develop a post compilation and testing software utility that identifies the start of each code piece and the end of each code piece and rearranges the code pieces. The arrangement of each client library is saved so that when the server communicates with a client the server will know how to correctly process the data with the DRM process such that the client can decrypt the server encrypted data. DRM Sequence data can be sent to the client when each client library contains software to process DRM Sequence Key data. Libraries without DRM Sequence Key can be uniquely built for each client using the techniques described herein. Furthermore, unique (scrambled) client libraries can be built with DRM Sequence Key data being incorporated into the client library processing to allow further unique processing by each client. Libraries without DRM Sequence Key data can be scrambled when being sent to the client or when being installed by the client and preferably scrambled before being sent to the client on the server side.
5. When DRM Sequence Key data is contained in the library, the code library delivered to a client device consists of a number of Functions without information that indicates how the Functions should be called. Code sequencing data (DRM Sequence Key) or with a default code execution sequence that can be overwritten with data received from the server, and the execution sequence change can be achieved without sending a new client library. This means that server supplied data can define the code execution sequence of the client library.
6. Each reversible code primitive that will be executed by the client library is tested to make sure that the code primitive does not crash or corrupt the data and is truly reversible. (Non-reversible functions can also be used but are not as flexible in terms of uniquely randomizing the code execution sequence, meaning the execution sequence of reversible functions can be made more random than non-reversible in how they can be sequenced.)
7. The code structure of the client library is sequenced by interpreting the virtual machine instruction set or the state machine sequence, or other sequencing processes.
8. The code development process identifies the address of a code primitive or the code necessary to implement a virtual instruction or reversible function. The length of each virtual instruction is known by the server client library builder server process.
9. When a client requests a code download, the client library builder server process shuffles or arranges the virtual instructions in random order. Therefore, the sequential address order of virtual instructions or code primitives is different from client to client without recompiling the code sequences or the client library.
10. The above process can generate a library whereby there is sequencing information included in the code library and the client library builder process embeds the appropriate sequence data within the randomized code library. However, other embodiments extend the client library memory image scrambling process described above to build a client library without sequencing information in the client library. In such embodiments the sequencing information that defines how a client library will execute data can be data received from the server after the client library is downloaded, after the client library is installed, or the sequencing data can be received from the content being protected or as part of the content download process or after the content download process when a consumer goes to use the content (play, listen, run, execute, or access the content).
11. The server when preparing DRM data for the client device will know the layout of each individual client library and will process the key data using instruction sequences data and key processing sequences unique for each client.

Any software design or code structure can be used to design and process any data or the execution sequence described in this patent application. Software design methods such as a virtual machine instruction set, state machines, hieratical state machines, flow diagrams, sequencer diagrams, or function point table, or double indirection function pointer tables (or multiple levels of pointer indirection), or linked listed of execution sequences, states or instructions can be used with processing sequencer and other data.

Another aspect is to defines a process that is used to generate client unique firmware code images with each unique code image containing either common DRM Process Steps or each code image can contain client unique DRM Process Steps. In one embodiment there are two elements that need to be present. Those are the client firmware library and information that defines the Processing Steps (DRM Process Steps) used to encrypt (unprotect) data received from the server. The Processing Steps is referred to as the DRM Process Steps.

The client unique DRM Processing information and client unique or client common firmware library can be loaded into the client and executed in one of many ways including the following:

1. A client firmware or software code load process whereby each client library is unique (or pseudo unique). With this method each client receives a unique client library (code image or code and data image) and there is preferably no DRM Sequencing Key in the software code image delivered by the server. Each library delivered from the server has unique code and unique DRM processing for each client inherent within the code and not using a separate DRM Sequencing Key. The actual DRM process can be unique for each client in addition to the client code being unique without using a DRM Sequencing Key.

2. The process above with the addition of a DRM Sequencing Key.
3. A client firmware or software code load process whereby each client library is unique and also requires a DRM Sequencing Key in the software code image delivered by the server and each library delivered from the server is unique for each client and also uses a unique DRM Sequencing Key. The actual DRM process can be unique for each client in addition to the client code being unique. Additionally, the unique DRM process of each client can be made even more unique by applying the client unique DRM Sequencing Key to a client unique firmware image.
4. A client firmware or software load process whereby each client library is identical but the actual DRM processing is uniquely defined by a DRM Sequencing Key sent as part of the code library or as a separate step.
5. A two or more phase (multiple phases) download process whereby a common firmware download process is supported by one or more additional code download phases whereby each additional download phase performs client integrity checking to make sure the client software library has not been modified, tampered with, or hacked.
6. A combination of any one of the above steps
   1. Loader—Looks like current DRM technology
   2. Phase 2—Client unique DRM state processing "keying" data making each client unique.

In an embodiment, Keyed One Time Pads are used whereby the code for each client using the OTP (One Time Pad) technology is unique and the OTP methods themselves are unique and the OTP keys (the Pad) is unique and client unique encryption is used to protect all elements of the client and its processing and client unique code obfuscates the operation of each client. The sender can include a hash of the OTP seed so that the receiving end can determine if the appropriate OTP seed key on the receiving end is being used. Because each client can be made unique when the client is distributed from the server each client can generate its OTP pad seed in different ways.

One-time pad technology can be applied to any portion of the DRM processing or DRM Sequence Key or library code encryption/decryption. For example the following one-time processing technology can be applied to any portion of the DRM processing, DRM Sequence Key, code library encryption/decryption, or client/server protocol technology or a combination of any of these and other processing that is part of the DRM process. One-time pads data that is used to provide a client with keying data used only one time can be embedded in the client library, or delivered from the server, or combined with both client and server data whereby either the client or server data is itself either keyed using the DRM Sequence Key methods of this patent, or one-time unique using pad data whereby the pad data itself can be further protected by one-time pad methods.

When processing a DRM, with say ECMs, the code to handle the EMM key to ECM processing needs to be keyed and the key changes must change the memory layout of the EMM key when the EMM key is used to decrypt ECMs so that a single memory probe cannot be used to extract the EMM key. This means that the client library should have multiple ways to handle the EMM key when processing ECMs with different memory layouts. This also means that there needs to be different ways of processing with the master key such that a single memory or object reference does not exist when different keys or sequences are used by the server.

Self Modifying Code may be used as a way to create Sequenced code with conditional jumps in the code based on key data.

Self modifying functions, in an embodiment, include side effects that mangle or build something else used at a different time in the process. For example, successful execution of Functions 25 and 174 needs to be performed (and will be performed if the correct server side keying data is supplied) to modify the run time environment or run time code for Function 8 to operate correctly. Code sequences must be performed correctly for the client library to operate correctly and to be sequenced correctly and to have the run time code (after modification by prior functions and key data) to be correct. This means the code for function F8 as delivered by the server is not the correct functioning code but will become correct after other functions F4 and F3 modify the code for function F8.

The process illustrated in FIG. 8 can have a content specific key added to or replacing one of the other three keys shown in elements 626, 636, 646. Other similar encryption or processing steps can be added, removed, or rearranged.

By using the design methods described herein each Function can have a different state machine or virtual machine encryption processing and keying method as shown in FIG. 8 and there would be different FIG. 8 processing steps for each "F" (F1, F2, F3, . . . Fn) shown in FIG. 5.

The elements shown as 'ENC' (625, 635, 645) in FIG. 8 will actually be composed of processing primitives such as those shown in FIG. 4 and other processing primitives (not shown) including other functions, reversible functions, crypto functions, input/output functions, disk read/writes, memory read write, data store/retrieve functions, etc.

Aspects of the disclosed systems and methods include the design of software where each client is uniquely built (possibly even at download time) using keying data on the server side and scrambling the software runtime code image such that the code image to each client can be unique. This can also be achieved with designs without DRM Sequence Key processing and with DRM Sequence Key processing.

A software tool can be developed to build or scramble each software image downloaded to a client device wherein the scrambling process creates a unique client library code image. Features of such tools can include:
  VMs can be client specific.
  Bottom up design approach plus top down can protect both directions.
  No storage of client specific DRM code on a 2 way network.
  Client specific static/virtual machine data can be stored in smart card or secure micro on one-way networks.

The disclosed systems and methods may be deployed in various types of systems. One type of system provides DRM for off-line rights storage.

Another type of systems provide CA with no in-client device key storage and no client specific encrypted virtual machine or encrypted state machine or client specific code storage because it must be downloaded from the server. Such systems can provide:
  Online DRM—no static code analysis+each client has device or client specific DRM.
  Offline DRM has static code analysis but each client is unique and the way each client libraries or each file is processed can be varied based on keying data or based on a combination of keying data and client code decryption key data or both.

Each off-line PC DRM+2-way network device now has client specific DRM code and off-line key storage processing can be different for each client.

DRM Sequence data (60 and 160) can be changed with any time granularity and some examples include:

on each download or streaming of content or on each delivery of a file changing on a fractional percentage during the delivery of a file, stream, or content such as the DRM Sequence Data (60 and 160) changing after each 20% block of the delivery is performed time interval based (every day, every third day, etc.)

for each geographic region where content is delivered for example City 1 uses different DRM Sequence Data (60 and 160) than City 2 by different companies, whereby each company uses DRM Sequence Data (60 and 160) different than other companies.

While the above discussion provides an idea of how the DRM Sequence Data (60 and 160) can change, the same techniques of different techniques can be used to change any data in the system such as the Function Encryption/Decryption keys, Sequencer Encryption/Decryption keys, etc.

In an embodiment, keying is updated every 24 hours to force hackers to learn a new keying method. For example, DRM changes every day or for each movie, a new VM a day (new client updates daily), new check points, and/or new quantum data.

A protection system, in an embodiment, includes client inspection points in each processing sequence to detect correct HW and correct execution environment. Inspection points built into keying such as MAC address, chip ID, etc.

The systems and methods also apply to a secure DRM loader that is part of the client library or gets downloaded over the network at run time. There are different ways that such a system can be implemented using the techniques described herein and one or more portions of phase of the DRM download process can use the keying techniques described herein. The software code image of each client can be made unique by applying unique client code image encryption, or by having each code image be uniquely scrambled before being encrypted during the software delivery process, or by applying DRM Sequence Data to the software code image encryption/decryption, or by using a combination of these methods. The result will be that each client software code image can be made unique in one or more ways and the processing necessary to scramble or make each library unique can occur during the download of the code image to the client. This means that a unique software source code image for each client is not necessary and a post software development and software testing phase can make each client unique.

Smartcard design: encrypting multiple code images in a smart card having different keys not in the smartcard can be applied to smartcard design to have self-renewable smartcards be designed wherein in each smartcard there are two different libraries each encrypted with different keys not stored in the smartcard and using compressed code before encryption making static code analysis difficult. Smartcard can also include quantum data to further enhance the self-renewability of the smartcard whereby an operator can contact a subscriber to perform the renewal and since quantum data is involved the renewal will not work with perfect clones.

The one-time pad inventive process of this patent application can be applied to further obfuscating the keys within a smartcard such that both key data and one-time-pad data will be needed making the likelihood of a smartcard hack limited to a single card and that single card can be excluded from the quantum key update performed as part of the quantum renewal broadcast (without a return channel) on a one-way network.

Those of skill will further appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit without departing from the invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A client device for using encrypted data comprising:
an input data interface module for receiving protected data;
a memory for storing a plurality of decryption functions and sequencer data that defines a sequence of selected ones of the plurality of decryption functions and defines at least one additional operation; and a processor coupled to the input data interface module and the memory and arranged to sequentially apply the selected ones of the plurality of the decryption functions to the protected data in the sequence defined by the sequencer data, and to report to a server a quantum data selected from the group consisting of a number of movies watched on the client device, a time interval between certain channel changes on the client device, and when the client device was first powered on.

2. The client device of claim 1, wherein the input data interface module is further arranged for receiving the sequencer data.

3. The client device of claim 1, wherein the processor is further arranged to detect tampering of the client device.

4. The client device of claim 3, wherein the detection of tampering includes reading a hardware identifier.

5. The client device of claim 4, wherein the sequencer data further includes identification of a function for detection of tampering.

6. The client device of claim 1, wherein the processor is further arranged to, using a function identified by the sequencer data, read a hardware identifier of the client device and to report the hardware identifier to a server.

7. The client device of claim 1, wherein the processor is further arranged to modify one of the decryption functions, wherein modifying one of the decryption functions is triggered by a value in the sequencer data.

8. The client device of claim 1, wherein the processor is further arranged to modify one of the decryption functions by applying one of the plurality of the decryption functions identified by a value in the sequencer data to the one of the decryption functions.

9. The client device of claim 1, wherein at least part of the memory is in a smart card.

10. The client device of claim 9, wherein the smart card is arranged to store information that is unique to the client device.

11. The client device of claim 1, wherein the sequencer data further includes identification of a function to select the quantum data and to report the quantum data to the server.

12. The client device of claim 1, wherein the particular one of the plurality of decryption functions selected by a particular value in the sequence data changes with time.

13. A method of protecting data to be transmitted to a plurality of client devices, the method comprising:
receiving input data to be protected;
for each client device of the plurality of client devices, mapping sequencer data that describes an order in which selected ones of a plurality of protection functions will be applied to the input data, the mapping based on a mapping used by the respective client device for selecting the protection functions from the sequencer data, wherein each client device of the plurality of client devices has a unique mapping for selecting protection functions from sequencer data;
generating protected output data for each client device of the plurality of client devices by executing a software program to sequentially apply the selected protection functions to the input data according to the order described by the corresponding mapped sequencer data; and
transmitting the respective protected output data to each client device of the plurality of client devices; and
transmitting the sequencer data to the plurality of client devices, the sequencer data for use in decrypting the protected output data by each of the plurality of client devices.

14. A method of protecting data to be transmitted to a plurality of client devices, the method comprising:
receiving input data to be protected;
generating protected output data by executing a software program to sequentially apply selected ones of a plurality of protection functions to the input data according to an order described by sequencer data;
transmitting the protected output data to the plurality of client devices;
mapping the sequencer data for each client device of the plurality of client devices based on a mapping used by the respective client device for selecting the protection functions from the sequencer data, wherein each client device of the plurality of client devices has a unique mapping for selecting protection functions from sequencer data; and
transmitting the corresponding mapped sequencer data to each client device of the plurality of client devices.

* * * * *